(12) United States Patent
Brooks

(10) Patent No.: US 7,672,889 B2
(45) Date of Patent: Mar. 2, 2010

(54) SYSTEM AND METHOD FOR PROVIDING CUSTOMIZABLE INVESTMENT TOOLS

(76) Inventor: Kent F. Brooks, 1980 Grant Ave., San Francisco, CA (US) 94133

( * ) Notice: Subject to any disclaimer, the term of this patent is extended or adjusted under 35 U.S.C. 154(b) by 1621 days.

(21) Appl. No.: 10/892,611

(22) Filed: Jul. 15, 2004

(65) Prior Publication Data

US 2006/0015425 A1 Jan. 19, 2006

(51) Int. Cl.
*G06Q 40/00* (2006.01)
(52) U.S. Cl. .................................... 705/36 R; 705/36 T
(58) Field of Classification Search .................. 705/36
See application file for complete search history.

(56) References Cited

U.S. PATENT DOCUMENTS

| | | | |
|---|---|---|---|
| 6,345,261 B1 | 2/2002 | Feidelson et al. | |
| 6,360,210 B1 | 3/2002 | Wallman | |
| 6,415,268 B1 | 7/2002 | Korisch | |
| 6,421,653 B1 | 7/2002 | May | |
| 6,430,542 B1 | 8/2002 | Moran | |
| 6,453,303 B1 | 9/2002 | Li | |
| 6,470,325 B1 | 10/2002 | Leemhuis | |
| 6,484,151 B1 | 11/2002 | O'Shaughnessy | |
| 6,484,152 B1 | 11/2002 | Robinson | |
| 6,493,681 B1 | 12/2002 | Tertitski et al. | |
| 6,510,419 B1 | 1/2003 | Gatto | |
| 6,564,191 B1 | 5/2003 | Reddy | |
| 6,565,191 B1 | 5/2003 | Bolash et al. | |
| 6,601,044 B1 | 7/2003 | Wallman | |
| 6,636,834 B1 | 10/2003 | Schirripa | |
| 6,681,211 B1 | 1/2004 | Gatto | |
| 7,016,873 B1 * | 3/2006 | Peterson et al. ........... 705/36 R |
| 7,039,608 B2 * | 5/2006 | Johnson et al. ........... 705/36 R |
| 2002/0099637 A1 | 7/2002 | Wilkinson et al. | |
| 2002/0116309 A1 * | 8/2002 | Keyes et al. ................. 705/36 |
| 2002/0133456 A1 * | 9/2002 | Lancaster et al. ............. 705/37 |
| 2003/0014337 A1 | 1/2003 | Matthews et al. | |
| 2003/0018556 A1 | 1/2003 | Squyres | |
| 2003/0023526 A1 | 1/2003 | Stewart | |
| 2003/0061064 A1 | 3/2003 | Elliott | |
| 2003/0061119 A1 | 3/2003 | Kocher | |
| 2003/0065600 A1 | 4/2003 | Terashima et al. | |
| 2003/0088498 A1 * | 5/2003 | Clark et al. .................. 705/37 |
| 2003/0093347 A1 | 5/2003 | Gray | |
| 2003/0093351 A1 | 5/2003 | Sarabanchong | |
| 2003/0172017 A1 | 9/2003 | Feingold et al. | |
| 2003/0177056 A1 | 9/2003 | Winther | |
| 2004/0019548 A1 | 1/2004 | Hu et al. | |
| 2004/0019549 A1 * | 1/2004 | Gulbrandsen ................ 705/36 |
| 2004/0034586 A1 * | 2/2004 | Keyes et al. .................. 705/36 |
| 2004/0039676 A1 | 2/2004 | Trainer | |
| 2004/0054612 A1 | 3/2004 | Ocampo | |
| 2004/0073508 A1 | 4/2004 | Foster et al. | |
| 2004/0103052 A1 | 5/2004 | Eapen | |

(Continued)

*Primary Examiner*—Jagdish N Patel
*Assistant Examiner*—Kevin Poe
(74) *Attorney, Agent, or Firm*—Sonnenschein Nath & Rosenthal LLP

(57) ABSTRACT

Computer-implemented methods and systems to help investors determine the fair value and ratings of assets (such as equity or debt instruments, etc.), and thereby make better informed investment decisions, through: automatically consolidating selected asset historical performance, forecasting and rating information; automatically computing asset valuations based on default and/or customized valuation parameters; and automatically determining asset under or over valuation.

21 Claims, 18 Drawing Sheets

U.S. PATENT DOCUMENTS

2004/0148248 A1* 7/2004 Allen et al. .................... 705/37
2005/0027632 A1* 2/2005 Zeitoun et al. ................. 705/36
2005/0091134 A1* 4/2005 Rossides ....................... 705/35
2005/0114260 A1* 5/2005 Gula ........................... 705/39
2006/0015425 A1* 1/2006 Brooks ........................ 705/35
2007/0078746 A1* 4/2007 Ciampi et al. ............. 705/36 R

* cited by examiner

| | Price | | P/E | | | +Under/-Over Valuation | | | Investment Tools | | |
|---|---|---|---|---|---|---|---|---|---|---|---|
| Stock | Last | Change | Prior 12M | Cur FYear | Fair PE | Val 12M | Val 04 | Time | Grade | Rating | %Tile |
| GE | 32 | -0.74 | 27.0 | 21.0 | 24.6 | -10% | 11% | 15:01 | B+ | 89 | 83% |

700

702　704　706　708　710　712

| Trading/Broker Return 716 | Investor/Advisor Email/IM 714 | Full Valuation Quote 718 | Valuation Investigations 720 | Compare Val. Quotes 722 |

FIG. 7

Stock Summary

GE – GENERAL ELECTRIC CO ◄——— 802

800

|  | 810 |  |
|---|---|---|
| Grade | Rating | %Tile |
| B+ | 89 | 83% |

804 Summary Valuation

| | | | | | |
|---|---|---|---|---|---|
| Last Price | 32.10 | S&P | *** | Mstr | |
| PE Pr 12 M | 27.0 | FCall | B | Schw | 1.7 |
| PE CurYr | 21.0 | Anal Targ | 40.00 | %+U/-O | |

Standard Valuation
(+under/-over valued)

| Val P12m EPS | -10% |
| Val 04 EPS | 11% |
| S&P P12M | 4% |

Historical Avg. Valuation

| Val P12m EPS | 5% |
| Val 04 EPS | 25% |
| S&P P12M | 7% |

Detail Valuation Factors

| | | | | 806 |
|---|---|---|---|---|
| %/Day Vol | 0.20% | Ptax IRR-STD | -- | Fair PE | 10% | Fair PE | 24.6 |
| %Tax-Div | PreTax | Ptax IRR-Hist | -- | Hold Time-Yr | 11% | Hold Time-Yr | 5 |
| %Tax-CGains | PreTax | Cur Div. Yield | 2.4% | SellPE-TrdAvg | | SellPE-10YrAvg | 22 |
| %Risk Prem | 0.00% | Div%-CurYr | 54% | Div%-CurYr | 54% | Div%-10YrAvg | 46% |
| Val Meth | DiscCFlow | An F5Yr EPS% | 9.9% | An F5Yr EPS% | 9.9% | 10Yr EPS G% | 13% | | 11.8% |

Analyst Recommendation Summary

Schwab            B

Goldman Sachs     Not Rated/Attractive

Standard & Poors  Hold

Argus             BUY

First Call Consensus  Buy

| Trading/Broker Return |
| Compare Val. Quotes |
| Spread Sheet Download |

| Valuation Investigations |
| Funds Momentum |
| Investor/Advisor Email/IM |

900

Investment Detail

| Description | Symbol | Quantity Lng/Shrt | Price | Market Value | Fair Valuation (+under/-over) Value 04 E | P12M | Factor % 04 E | P12M | F5Yr EPS | Anl Rec | Be ta | 04 PE | % Pr. Div. | S&P *** | EPS | Val | Grd. | Valuation Model Rating # | %Tile |
|---|---|---|---|---|---|---|---|---|---|---|---|---|---|---|---|---|---|---|---|
| Investments | | | | | | | | | | | | | | | | | | | |
| AGILENT | A | 500L | 34.33 | 17,165 | -5,299 | -9,310 | -31% | -54% | 12% | 2.3 | 2.5 | 22 | 0.0% | 3 | NR | 12 | C | 75 | 25% |
| AOL/TW | TWX | 1000L | 17.23 | 17,230 | -1,587 | -1,113 | -9% | -6% | 14% | 2.1 | 2.2 | 25 | 0.0% | 4 | C | 16 | B | 83 | 50% |
| APPL MATER | AMAT | 500L | 21.76 | 10,880 | -1,161 | -6,920 | -11% | -64% | 18% | 2.0 | 2.3 | 22 | 0.0% | 4 | B | 16 | C | 74 | 23% |
| BANK AMERICA | BAC | 500L | 82.13 | 41,065 | 27,234 | 24,118 | 66% | 59% | 10% | 2.2 | 0.8 | 10 | 3.9% | 3 | A- | 82 | A | 95 | 94% |
| CITI | C | 1000L | 50.46 | 50,460 | 30,738 | 19,841 | 61% | 39% | 13% | 1.3 | 1.4 | 12 | 3.2% | 5 | A+ | 36 | B | 87 | 65% |
| DELL | DELL | 1000L | 33.49 | 33,490 | 7,700 | 272 | 23% | 1% | 16% | 1.9 | 1.7 | 23 | 0.0% | 3 | B+ | 36 | B | 85 | 58% |
| GE | GE | 2000L | 32.79 | 65,580 | 7,214 | -6,558 | 11% | -10% | 10% | 1.9 | 1.1 | 19 | 2.4% | 3 | A+ | 30 | B | 87 | 65% |
| HP | HPQ | 1000L | 23.00 | 23,000 | 6,953 | -5,217 | 30% | -23% | 10% | 2.1 | 1.7 | 14 | 1.4% | 3 | A- | 23 | B- | 83 | 50% |
| INTEL | INTC | 2000L | 29.69 | 59,380 | 25,527 | -1,620 | 43% | -3% | 15% | 1.7 | 2.0 | 20 | 0.5% | 5 | A | 30 | A | 94 | 92% |
| JOHNSON& JOHNSON | JNJ | 1000L | 53.76 | 53,760 | 31,349 | 17,055 | 58% | 32% | 13% | 2.4 | 0.9 | 17 | 1.8% | 4 | A+ | 48 | B+ | 86 | 61% |
| MICROSOFT | MSFT | 2000L | 26.70 | 53,400 | 10,532 | -2,868 | 20% | -5% | 12% | 1.3 | 1.6 | 21 | 0.6% | 5 | B+ | 29 | B | 84 | 56% |
| PFIZER | PFE | 2000L | 36.90 | 73,800 | 51,497 | 14,086 | 70% | 19% | 13% | 1.7 | 0.8 | 16 | 1.8% | 4 | A+ | 40 | B | 84 | 56% |
| P&G | PG | 500L | 103.86 | 51,930 | -1,851 | -8,619 | -4% | -17% | 10% | 2.1 | 0.8 | 20 | 1.8% | 5 | A | 86 | B | 83 | 50% |
| WASH MUT | WM | 2000L | 45.28 | 90,560 | 92,534 | 84,037 | 102% | 93% | 12% | 2.7 | 0.8 | 10 | 3.7% | 5 | A- | 41 | B+ | 89 | 78% |
| WELLS FARGO | WFC | 1000L | 57.63 | 57,630 | 37,479 | 26,666 | 65% | 46% | 12% | 1.6 | 0.8 | 13 | 3.1% | 3 | A | 44 | B+ | 86 | 61% |
| WILL SONOMA | WSM | 1000L | 32.03 | 32,030 | 25,075 | 10,349 | 78% | 32% | 20% | 1.9 | 1.1 | 18 | 0.0% | 3 | B | 36 | B+ | 87 | 65% |
| TOTAL | | 17000 | | 731,360 | 343,933 | 154,198 | 48% | 24% | 13% | 1.9 | 1.2 | 16 | 1.9% | 3 | | | B+ | 87 | 59% |

AVERAGE VALUATION FACTORS

| Model | CF Disc-Std | |
|---|---|---|
| Hold Time | Years | 5.0 |
| Sell P/E'S | TrdAvg | 22 |
| Disc IRR | PtaxPersnl | 10% |
| Avg Risk Prem | Personal | 0% |
| Tax-CG | Pretax | 0% |
| Tax-Div | Pretax | 0% |

| Trading/Broker Return 910 |
|---|

| Valuation 902 Investigations |
|---|

| Investor/Advisor Email/IM 906 |
|---|

| Spread Sheet Download 908 |
|---|

| Funds Momentum 904 |
|---|

PORTFOLIO WEIGHTINGS

| | Market | Portfolio |
|---|---|---|
| BANKING | 10% | 18% |
| BROKERAGE | 3% | 0% |
| CONSUMER CYC | 15% | 7% |
| CONSUMER NCYC | 10% | 9% |
| INDUSTRIAL | 14% | 11% |
| PHARMA | 8% | 18% |
| RETAIL-GEN | 6% | 7% |
| COMPUTER & COMMS | 7% | 14% |
| SEMICONDUCTOR | 5% | 10% |
| SOFTWARE | 5% | 7% |
| OTHER | 18% | 0% |
| TOTAL | 100% | 100% |

FIG. 9

Key Cash Flows to be Discounted
| | |
|---|---|
| Current Stock Price at time = 0 | $P_o$ |
| Dividends Period t | $D_t$ |
| Future Stock Selling Price at time = x | $P_x$ |

Future Cash Flow Computation Bases
| | |
|---|---|
| Annual EPS Growth Est. % | $g$ |
| Earnings Per Share at time = 0 | $EPS_o$ |
| Earnings Per Share at time = t | $EPS_t = (EPS_o)*(1 + g)t$ |
| Average Dividend % EPS | $d\%$ |
| Dividend at time = t | $D_t = (EPSt)*(d\%)$ |
| Stock's P/E Ratio at time = t | $PE_t$ |
| Stock's Future Price at time = t | $P_t = (PE_t)*(EPS_t)$ |

Rate of Return for Discounting
| | |
|---|---|
| Basic Expected Rate of Return Expectations | $r$ |
| Annualized Risk Premium | $p$ |
| Risk Adjusted Rate of Return Expectations | $i = r + p$ |

Fair Price Calculations
| | |
|---|---|
| Present Value at risk-adjusted rate of return expectations | $PV_i$ |
| Fair Price | $FP = PV_i * (-P_o + \sum D_i + P_x)$ |
| Valuation Factor | $VF = FP/P_o$ |
| +Over/-Under Valuation % | $V\% = (VF - 1)*100$ |

Taxation Treatment Factors
| | |
|---|---|
| Dividend Tax Rate | $T_d$ |
| Capital Gains Tax Rate | $T_c$ |
| Tax Free Account Rate | $T_f$ |

Stock     4102 GE General Electric     Curr Price     4104 33.00

Investor Cash Flows

| Year | EPS | Buy/Sell | Dividend | Taxes | Total |
|---|---|---|---|---|---|
| Curr Price | 1.49 | -33.00 | | | -33.00 |
| 1 | 1.64 | 0.00 | 0.88 | 0.00 | 0.88 |
| 2 | 1.80 | 0.00 | 0.97 | 0.00 | 0.97 |
| 3 | 1.98 | 0.00 | 1.07 | 0.00 | 1.07 |
| 4 | 2.17 | 0.00 | 1.17 | 0.00 | 1.17 |
| 5 | 2.39 | 52.55 | 1.29 | 0.00 | 53.84 |
| 6 | | 0.00 | 0.00 | 0.00 | 0.00 |
| 7 | | 0.00 | 0.00 | 0.00 | 0.00 |
| 8 | | 0.00 | 0.00 | 0.00 | 0.00 |
| 9 | | 0.00 | 0.00 | 0.00 | 0.00 |
| 10 | | 0.00 | 0.00 | 0.00 | 0.00 |
| 4106 | Totals | 19.55 | 5.39 | 0.00 | 24.94 |

Overall Valuation     4108

| | |
|---|---|
| Present Value Dividend + Sale | $36.64 |
| Current Value | $33.00 |
| $ +under/-over valued | $3.64 |
| % +under/-over valued | 11.0% |
| Expected IRR | 10.7% |

Valuation Parameters     4110

| | | |
|---|---|---|
| Model: | Disc CFlow | |
| Valuation Type | Standard | |
| Base EPS: | Cur FYear | 1.49 |
| Fut 5 Yr EPS Growth | FCall Avg | 9.9% |
| Divid %: | 5 Yr. Avg | 54% |
| Hold Time: | Years | 5 |
| Sell PE | 5 Yr. Avg | 22.0 |
| Tax Rate-Dividend | Pretax | 0.0% |
| Tax Rate-Cap Gain | Pretax | 0.0% |
| Valuation Model IRR's | | |
| Basic IRR | Avg Investor | 10.0% |
| Risk Premium | None | 0.0% |

FIG. 12

Stock     GE     General Electric     Curr Pric     33.00

| Year | Avg Price | EPS | Dividend | Divid % | Avg P/E | EPS Grth % | Inflat |
|---|---|---|---|---|---|---|---|
| 2003 | 28.50 | 1.55 | 0.77 | 50% | 20 | 3% | 1.6% |
| 2002 | 31.10 | 1.51 | 0.73 | 48% | 18 | 7% | 1.2% |
| 2001 | 42.10 | 1.41 | 0.66 | 47% | 29 | 11% | 1.4% |
| 2000 | 51.90 | 1.27 | 0.57 | 45% | 42 | 19% | 2.5% |
| 1999 | 36.50 | 1.07 | 0.47 | 44% | 37 | 15% | 2.7% |
| 1998 | 30.20 | 0.93 | 0.40 | 43% | 32 | 13% | 3.2% |
| 1997 | 22.50 | 0.82 | 0.36 | 44% | 28 | 12% | 4.0% |
| 1996 | 13.70 | 0.73 | 0.32 | 44% | 21 | 12% | 4.1% |
| 1995 | 9.60 | 0.65 | 0.28 | 43% | 18 | 12% | 4.4% |
| 1994 | 8.15 | 0.58 | 0.25 | 43% | 15 | 10% | 4.5% |
| 1993 | 7.50 | 0.51 | | | | | |

4142

Averages     4144

Simple Averages
- 5 Year     47%    29    11%
- 10 Year     46%    26    11%

Compounded Averages
- 5 Year    -1%                     11%
- 10 Year    14%                    12%

Trended Adjusted Averages
- Standard                      48%    22    10%

Discounted Cash Flow Model's Rate of Return Based on Averages

| | Pretax | Inflat. Adj. Pretax |
|---|---|---|
| 1998 Buy-2003 Sell | 3.4% | 1.5% |
| 1993 Buy-2003 Sell | 21.6% | 17.9% |

4140

Stock    XXXX           XXX Corporation         Time Periods    Annual

| Period | Forecasts Avg. Forecast | Actual | Surprise Amount | % | Analyst Targets vs. Price | Analyst Recc-avg | Ratings S&P *** | EPS | Morn.-star | Invention's Grade | Rating |
|---|---|---|---|---|---|---|---|---|---|---|---|
| Fiscal Years |  |  |  |  |  |  |  |  |  |  |  |
| 2005 E |  | 1.77 |  |  |  |  |  |  |  |  |  |
| Curr 2004 & Estim. |  | 1.57 |  |  | 24.0% | 1.7 | 3 | A | 3 | B+ | 89 |
| 2003 | 1.51 | 1.49 | -0.02 | -1.3% | 19.0% | 1.9 | 3 | A | 3 | A- | 91 |
| 2002 | 1.53 | 1.51 | -0.02 | -1.3% | 12.0% | 2.2 | 3 | A | 3 | A- | 93 |
| 2001 | 1.38 | 1.41 | 0.03 | 2.1% | 8.0% | 2.0 | 4 | A+ | 4 | C+ | 76 |
| 2000 | 1.25 | 1.27 | 0.02 | 1.6% | 17.0% | 1.8 | 5 | A+ | 4 | C- | 71 |
| 1999 | 1.08 | 1.07 | -0.01 | -0.9% | 26.0% | 1.5 | 5 | A+ | 5 | C | 74 |
| 1998 | 0.90 | 0.93 | 0.03 | 3.2% | 21.0% | 1.3 | 5 | A+ | 5 | C+ | 77 |
| 1997 | 0.81 | 0.82 | 0.01 | 1.2% | 19.0% | 1.4 | 5 | A+ | 5 | B- | 81 |
| 1996 | 0.74 | 0.73 | -0.01 | -1.4% | 15.0% | 1.6 | 5 | A+ | 5 | B+ | 87 |
| 1995 | 0.64 | 0.65 | 0.01 | 1.5% | 12.0% | 1.7 | 5 | A+ | 5 | A- | 92 |
| 1994 | 0.57 | 0.58 | 0.01 | 1.7% | 11.0% | 1.8 | 5 | A+ | 5 | A | 96 |
| 1993 | 0.50 | 0.51 | 0.01 | 2.0% | 9.0% | 1.7 | 4 | A | 5 |  |  |

4120

| Averages |  |  |  |  |  |  |  |  |
|---|---|---|---|---|---|---|---|---|
| Simple Averages |  |  |  |  |  |  |  |  |
| 5 Year | 0.0% | 16.4% | 1.9 | 4.0 | A | 3.8 | B | 81 |
| 10 Year | 0.6% | 16.0% | 1.7 | 4.5 | A+ | 4.4 | B+ | 84 |
| Trended Averages |  |  |  |  |  |  |  |  |
| 5 Year | -0.9% | 15.0% | 2.0 | 2.0 |  |  |  |  |
| 10 Year | -0.3% | 17.8% | 1.6 | 1.6 |  |  |  | 4122 |

FIG. 13

Investor ID:
Investor Category: Avg. Investor Taxable Equities  4180
IRR & Cash Flow Tax Treatment: Pretax Computations

| | Valuation Model Parameters | | | |
|---|---|---|---|---|
| | | Standard Valuation | Historical Avg. Valuation | |
| Val Meth | Disc CFlow | PTax IRR-STD | 10% | PTax IRR-StdHist | 11% |
| Model's Std | | ATax IRR-STD | 7% | ATax IRR-StdHist | 8% |
| Taxation | PreTax | Hold Time-Yr | 5 | Hold Time-Yr | 5 |
| Tax- Div | Curr Std Rate | Sell PE | TrdAvg | Sell PE | 10YrAvg |
| Tax-Cap Gn | Curr Std Rate | Div % | CurYr | Div % | 10YrAvg |
| | | Fut EPS Grth % | FCall F5Yr | Hist EPS Grth % | 10YrAvg |

FIG. 15

| 4160 | Funds Flows Tracking & Momentum ||||||||
|------|---------------------------------|---|---|---|---|---|---|---|
| | Net Equity Funds |||| Net Money Market Funds ||||
| Month | $B | CYr | AvgYr | Index | $B | CYr | AvgYr | Index |
| Mar | 0.3 | 0.00% | 0.60% | -98% | -32.3 | -1.60% | -0.50% | -202% |
| Apr | 16.1 | 0.60% | 0.90% | -33% | -53.8 | -2.70% | -1.90% | -41% |
| May | 12.1 | 0.50% | 0.70% | -39% | -17.8 | -0.90% | 0.90% | -198% |
| Jun | 18.6 | 0.70% | 0.60% | 24% | 22.1 | 1.10% | -0.80% | 244% |
| July | 21.5 | 0.80% | 0.40% | 125% | -12.9 | -0.60% | 1.80% | -137% |
| Aug | 23.4 | 0.90% | 0.40% | 116% | -20.3 | -1.00% | 1.70% | -160% |
| Sept | 17.3 | 0.60% | 0.40% | 56% | -50.5 | -2.50% | -0.70% | -275% |
| Oct | 25.3 | 0.90% | 0.50% | 79% | -22.1 | -1.10% | 2.40% | -146% |
| Nov | 14.9 | 0.60% | 0.60% | -8% | -7.6 | -0.40% | 3.20% | -112% |
| Dec | 14.2 | 0.50% | 0.40% | 25% | -22.6 | -1.10% | -0.20% | -430% |
| Jan | 43.8 | 1.20% | 0.90% | 31% | -19.8 | -1.10% | 3.00% | -138% |
| Feb | 32 | 0.90% | 0.60% | 46% | -30 | -1.70% | 1.70% | -202% |
| Mar | 28 | 0.80% | 0.60% | 23% | -16 | -0.90% | -0.50% | -69% |
| Year | 22.3 | 0.80% | 0.70% | 26% | -20.9 | -1.10% | 1.20% | -200% |

FIG. 16

SYSTEM AND METHOD FOR PROVIDING CUSTOMIZABLE INVESTMENT TOOLS

FIELD OF THE INVENTION

The present invention relates generally to systems and methods for providing computer-based investment decision making and planning tools and, in particular, tools that provide investors with means for determining and/or evaluating a fair value for an equity, debt, property or other asset based on a variety of data sources.

BACKGROUND OF THE INVENTION

The rapid growth of the Internet and personal computing capabilities has impacted virtually every aspect of business and social activities. Among those activities most significantly affected is investing; that is, the buying and selling of stocks, bonds and other assets. Today's investors are able to access (in ways never before possible) information regarding investment opportunities throughout the world. Moreover, in an attempt to satisfy their customers' seemingly insatiable appetites for such information, service providers such as brokerage houses, investment managers, investment find managers, etc. have installed and are operating Internet-based communication tools (such as web sites, etc.) to allow those customers 24-hour a day access to that information.

Yet, despite global access to the vast information provided by Internet-based broker, investment fund and investor service provider systems (hereinafter "broker systems"), from the so-called "value investor's" viewpoint that information is generally lacking an important quality and perspective, relating to the "fair valuation" of those investments. Unlike their "day trader" or "momentum investor" counterparts (who seem to be primarily interested in shorter and medium-term price impacting information like breaking news, current price comparisons, changes in short-term forecasts and economic indicators, and historically focused statistics), "value investors" often also seek information regarding the longer-term characteristics of investment opportunities (stocks, bonds, properties, etc.). Among the most important pieces of information desired by such investors is an estimate of an asset's "fair value"; which is a measure of the asset's intrinsic longer-term worth; and which can be compared to its present price to better understand whether an asset might be currently undervalued or overvalued.

Most value investors are interested in both determining an asset's "fair value" and comparing it to the value of other assets, so they can more effectively choose between alternative investments. Such asset values depend on many factors, including of course the expected time that the investor intends to hold the asset before selling it. For "day traders" and "momentum investors" that time period can be as little as a few hours or months, but for "value investors" that time period can be much more significant. Existing shorter-term analyst opinions and earnings forecasts, breaking news, price trend charts and statistical comparisons, financial reports, and research reports (which are often provided in abundance by conventional brokerage systems), satisfy the needs of most "day traders" and "momentum investors", but are primarily just a starting point for the analyses of value investors. Where a broker system today does attempt to provide information on the fair value of a stock or other asset, that information primarily tends to be either: limited and very basic; a value grade which is usually derived quite judgmentally (e.g., "B+"); a statistic whose computation is not easily understandable, explained or documented; or produced by rare, cumbersome to use and understand, single asset investment valuation tools. This environment makes it quite laborious for value investors to understand the under/over valuation position of stocks, bonds, properties, portfolios and other investments, thus making it much more difficult for those investors to analyze, evaluate and manage their portfolios.

Accordingly, there is a need for systems that will allow investors interested in valuation oriented information to more easily and interactively query, analyze, and evaluate the valuation of securities, properties and other assets in a manner that can more effectively reflect their personal investment goals and profiles.

SUMMARY OF THE INVENTION

The present invention provides computer-implemented methods and systems to help investors more quickly and easily determine and evaluate the "fair value" and ratings of stocks, properties, and other assets or funds or portfolios, compare them to those of other investment options, and thereby make better and more confident investment decisions. In one embodiment, a computer-implemented method in which a present fair value of an asset is determined and evaluated (e.g., by using one or more valuation models, which may be selected by a user) is provided. The present invention automatically consolidates selected (i) historical performance data regarding the asset, (ii) forecast information regarding the asset, and (iii) investment information service provider rating information regarding the asset; utilizing various valuation parameters aligned with standardized or customized investor profiles; presents the fair value of the asset and a reflection of its over/under valuation compared to its price; and provides perspective information on how the asset's valuation and performance compare to other similar assets.

Preferably, though not necessarily, the present fair value and/or key value evaluation information are determined and presented in response to only a single user action with a computer system, for example a selection of a user interface element presented in a graphical user interface (which dramatically reduces the time and effort in evaluating valuations). Among the various exemplary formats in which the fair value and key valuation information may be presented are: a quick valuation quote which includes an identification of the asset, its present price and summary fair value and ratings data; a detailed valuation quote which includes an identification of the asset, its present price, various ratings, historical and forecast statistics, and parameter values used to compute the fair value; and a portfolio valuation summary which in similar fashion illustrates valuation information regarding a group of assets on both summary and individual bases.

To increase the meaningfulness of valuations, the valuation model(s) used in accordance with the present invention might access investor profiles, which may include one or more of: risk premium preferences and tax treatment preferences. In one particular embodiment the fair value of an asset is determined according to a valuation model which calculates the present value of an asset's key cash flows (at a predetermined or investor-customized rate of return, and optionally tax and/or risk-adjusted bases), including in one example: (i) the expected future sellable price of the asset at the end of a defined holding period; and (ii) for each interim period, the investor's expected dividends or net distributed cash flows. That fair value can then be compared to the present price of the asset in various ways to communicate its level of under or over-valuation.

Alternatively, or in addition, the present invention may automatically provide key mutual find investment statistics and/or trends, which can help investors monitor market momentum related to the impact of net inflows and outflows of cash (e.g., in and out of individual funds or the market in general), and other mutual fund momentum statistics. Such information may be presented graphically so as to allow for easy review by an investor. Also, embodiments of the present invention support semi-automated valuation analysis communications (e.g., via e-mail, instant messenger, etc.) between investors and their advisors or other selected recipients.

BRIEF DESCRIPTION OF THE DRAWINGS

The present invention is illustrated by way of example and not limitation in the figures of the accompanying drawings, in which:

FIG. 7 illustrates an example of a quick asset valuation quote according to one embodiment of the present invention;

FIG. 8 illustrates an example of a detailed asset valuation quote according to one embodiment of the present invention;

FIG. 9 illustrates an example of a portfolio valuation summary according to one embodiment of the present invention;

FIG. 10 illustrates asset valuation logic embodied in a buy/hold/sell valuation model configured according to one embodiment of the present invention;

FIG. 11 illustrates an example of various asset valuation computation details produced in accordance with one embodiment of the present invention;

FIG. 12 illustrates an example of stock history details produced in accordance with an embodiment of the present invention;

FIG. 13 illustrates an example of various analyst forecast and ratings details produced in accordance with an embodiment of the present invention;

FIG. 15 illustrates an example of various valuation model customizations according to one embodiment of the present invention;

FIG. 16 illustrates an example of a chart produced in accordance with an embodiment of the present invention for mutual funds flow and momentum tracking.

DETAILED DESCRIPTION

Figure 1:
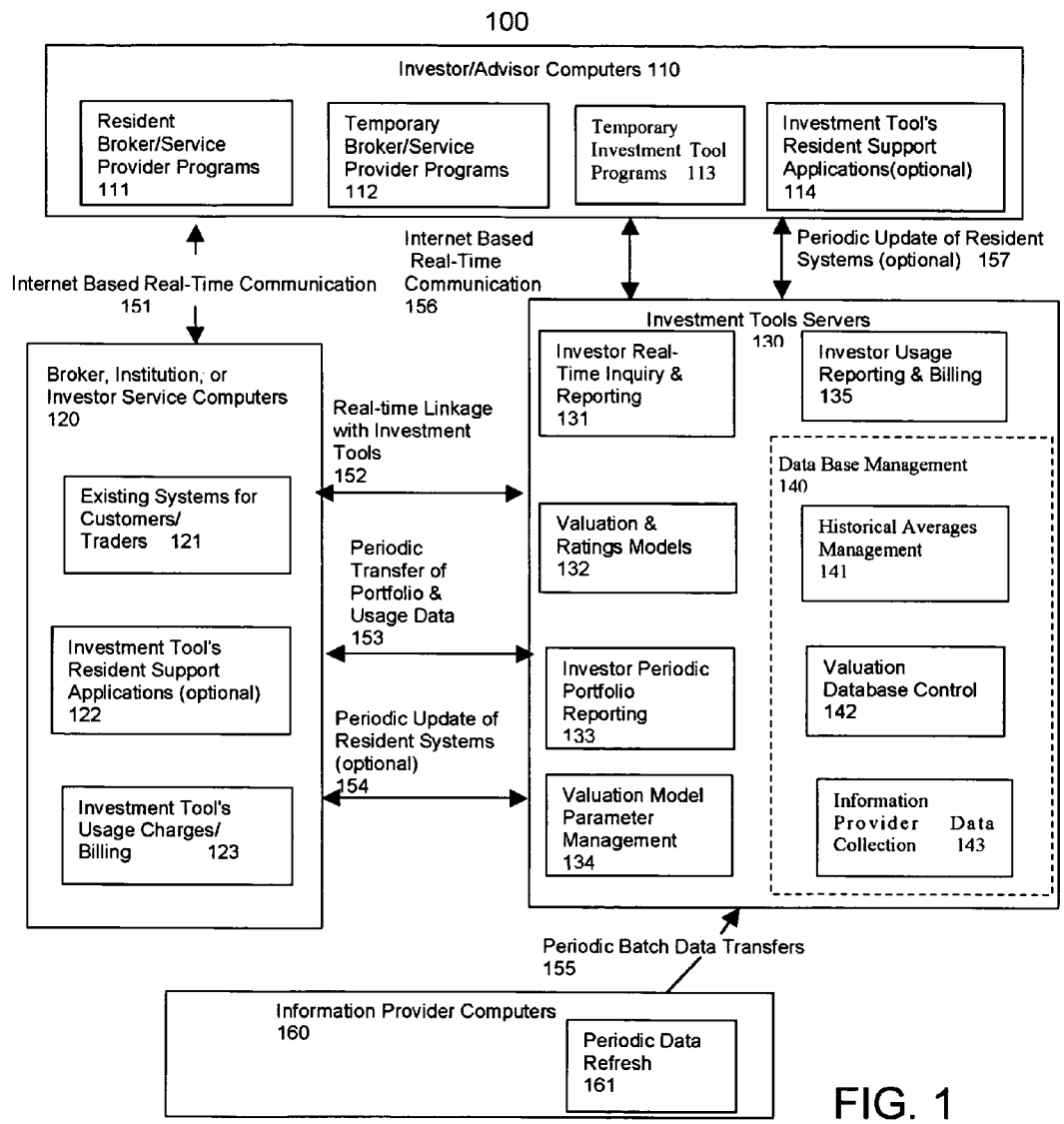
FIG. 1 illustrates an example of a system for providing customizable investment tools, according to one embodiment of the present invention.

Described herein are systems and methods for determining present fair values of assets such as stocks, bonds, properties etc., and presenting that information to users (investors, their advisors, etc.). In many cases, though not necessarily, investors will be able to determine and evaluate asset fair values in response to only a single user action (e.g., a single mouse click), with little or no data input on the part of the user, because of the use and availability of previously consolidated information, predefined valuation parameters, and standardized valuation computations. The present systems and methods overcome deficiencies in conventional broker systems by allowing investors to more quickly and easily (and, in some cases, though only a single user action with a computer system) analyze the valuation and/or ratings of stocks or other assets, and thereby make better-informed investment decisions with dramatically less effort that is required when using such conventional systems. Various embodiments of the present invention may be implemented so as to allow investors access to this valuation information through their existing brokerage, mutual or pension fund, or information service provider systems; or through broker-independent computer-based systems.

As indicated above, although present day Internet-based broker systems provide their investor clients with a great deal of basic research information regarding a stock or other asset, such systems offer only relatively crude measures for evaluating the real or fair value of those assets. For example, it is often the case that investors and/or their advisors are given only basic statistics such as a stock's "prior 12 month" or "future fiscal year" profit to earnings rations (P/Es) for use as their primary stock valuation factors. Obtaining more sophisticated valuations, and utilizing valuation tools or models, usually requires an investor to perform a large number of highly independent, and only semi-automated steps and processes.

Just as problematic, many conventional valuation methods and ratings do not recognize differences in three very important stock valuation factors: an investor's rate of return expectations; the impact of taxes on the investment results; and some investors' need for a risk premium on higher risk assets. For example, under identical buy/hold/sell scenarios, the amount that a particular asset (e.g., a stock) is under or over valued to different investors may change significantly if: the investors have different investment return expectations (e.g., 15% vs. 9%); the stock is being bought for a taxable or non-taxable trading account; an investor has loss carry-forwards which can be utilized to offset taxes on new gains; or an investor considers the particular industry extremely risky at the time of the purchase. Nevertheless, most broker systems do not provide any (or at least any straightforward) way to make valuation adjustments to accommodate these (and other) factors.

As a result of these deficiencies in conventional broker systems, investors attempting to understand an asset's fair value usually are faced with laborious processes to collect, sift through, and analyze significant volumes of information. In addition to being time consuming, these processes tend to be manual and error prone in nature. Often, due to lack of time or frustration, value investors must forego detailed valuation and comparative analyses and make their asset purchase/sale decision based on more easily available but insufficient or less reliable valuation information and comparisons. Relying on such valuation short cuts can frequently result in poor investment decisions.

The present methods and systems help to remedy this situation by: allowing investors to determine (through various models which are user configurable and/or selectable) a present fair value of an asset (e.g., an equity, property or debt asset); consolidating (through computer-based processes) historical performance data, forecasting information, and rating information (e.g., from one or more investment information service providers) regarding the asset; utilizing valuation parameters that are aligned with the investors' individual (or group) profiles and/or goals; and providing investors with comparable valuation and performance statistics on similar investments. Once so determined, the fair value information may be presented to the investors in a format reflecting an over/under valuation of the asset as compared to its price, and also how it compares to an overall population of similar investments. This format allows the investors to determine at a glance whether there are obvious valuation issues associated with there buy or sell decision. As indicated above, these methods and systems may be integrated with other investment tools made available by the various investors' broker systems, and so the present valuation information may be provided in a seamless fashion as part of the investors' individual or group portfolios. In some embodiments, the valuation information may be computed and/or displayed in response to only a single user action with a computer system, such as a single mouse click or other similar action (e.g., representing the selection of a valuation option through a broker system web site or similar computer-based resource).

The present methods and systems support a variety of both new and conventional valuation and rating models. For example, according to one embodiment of the present invention a stock valuation analysis tool is provided that: simulates buying/holding/selling/paying taxes on a stock over a defined holding period; bases the simulation on a variety of forecasting, historical, and investor-specific parameters; and present value discounts that simulate cash flow to determine a present fair value. In some cases the valuation models may be initialized with standard or default values for one or more parameters, so that they work immediately without any further action or input by the user. For a given asset, investors may optionally compare valuations from multiple models (e.g., in response to a single user action) if the investor wishes to evaluate multiple valuation viewpoints related to the asset. Also, the investor or other user may be presented with various options to selectively utilize alternate valuation parameter statistical sources or personalize their investment expectations profiles to obtain more customized results from their preferred model. Dialogs between the user and the present valuation tools may occur over the Internet or other computer network or networks, or even on single computer-resident versions of the tools.

In the following description, for purposes of explanation, numerous specific details are set forth in order to provide a thorough understanding of the present investment tools. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, datum, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

An Investment System

FIG. 1 illustrates an exemplary investment system 100 for providing customizable investment tools, according to one embodiment of the present invention. Investment system 100 includes investor, mutual and institutional fund, and investor advisor computers 110 (hereafter "investor computers"), that allow investors to connect to a data network (e.g., the Internet) and to trade stocks and/or bonds (or more generally buy/sell assets) and gather investment information. Often investor computers 110 support many programs that aid in trading and investment information gathering. For example, a broker or service can provide temporary broker modules 112, which provide basic support of trading or passing of information to the investor, and may be loaded for only a single investment session. Those providers may also provide investors with broker modules 111 that reside on the investor computers to provide enhanced levels of support. Additionally, an investor computer may include temporary investment tool modules 113 that allow investors basic access to the present customizable investment tools, or resident investment tools programs 114 that provide enhanced support. Modules 111-114 may be applets running within a web-browser, application program interfaces, stand-alone programs, or similar program entities.

Also included in investment system 100 are broker, institution and investor service computers 120 (hereafter "broker computers"). Broker computers 120 can be servers that provide services to investor computers 110 through various service modules 121-123. Service module 121 provides traditional investor services for buying and selling investments, such as executing stock or other asset trades. Service module 121 also delivers charts, graphs, news, and similar information relating to investment assets. Also included in broker computers 120 is an optional support module 122 that allows broker computers 120 to directly provide the present customizable investment tools to investor computer 110 via communications link 151 (without having to transfer them to the investment tool servers 130). Link 151 allows for real-time Internet based communications between broker computers 120 and investor computers 110. Broker computers 120 also include a billing module 123 that accounts for the usage and charges associated with the use of the present investment tools when they are accessed directly on the broker computers 120.

Investment system 100 gathers up-to-date investment data from information provider servers 160. The investment data is periodically refreshed via refresh module 161. For stock assets, examples of potential information providers with such data servers might include companies such as Standard & Poors, Morningstar, Thomson First Call, or similar investment information providers. The investment information is primarily sent using periodic batch data transfers via communications link 155 to investment tools servers 130.

Investment tools servers 130 provide customizable investment tools configured in accordance with various embodiments of the present invention. Investment tools servers 130 include multiple modules, such as:
  Investor inquiry and reporting applications 131 that support most of the on-line processing requirements of investors and their computers.
  Valuation and ratings models 132 that support either real-time or periodic valuation and rating processing.
  Periodic portfolio reporting applications 133 that accept requests from institutions and/or individual investors and produce and distribute portfolio valuation summaries on a scheduled vs. real-time basis (e.g., quarterly).
  Parameter management applications 134 that are configured to manage default parameters and any personalizations requested by an investor for use in the valuation calculations performed in accordance with the present invention.
  Database management applications 140 that collect and consolidate data from information providers, compute historical averages, and populate one or more valuation databases configured in accordance with the present invention (this module may include various sub-modules, such as a historical averages management module 141, a valuation database control module 142, and an information provider data collection module 143, etc.).
  Investor usage reporting and billing applications 135 that consolidate investor usage information so that appropriate charges can be accounted for.

The periodic transfer of portfolio and usage data between broker computers 120 and investment tools servers 130 occurs over communications link 153. For investors who directly access the present customizable investment tools (i.e., without going through broker computers 120), communications link 156 provides Internet-based real time communications between investor computers 110 and investment tools servers 130. Additionally, communications link 152 allows broker computers 120 to access investment tools servers 130, as well. Periodic updates of optional investment tool systems that are resident on broker computers 120 or investor computers 110 occur through communication links 154 & 157, respectively.

Asset Trading and Evaluation Methods

Figure 2:
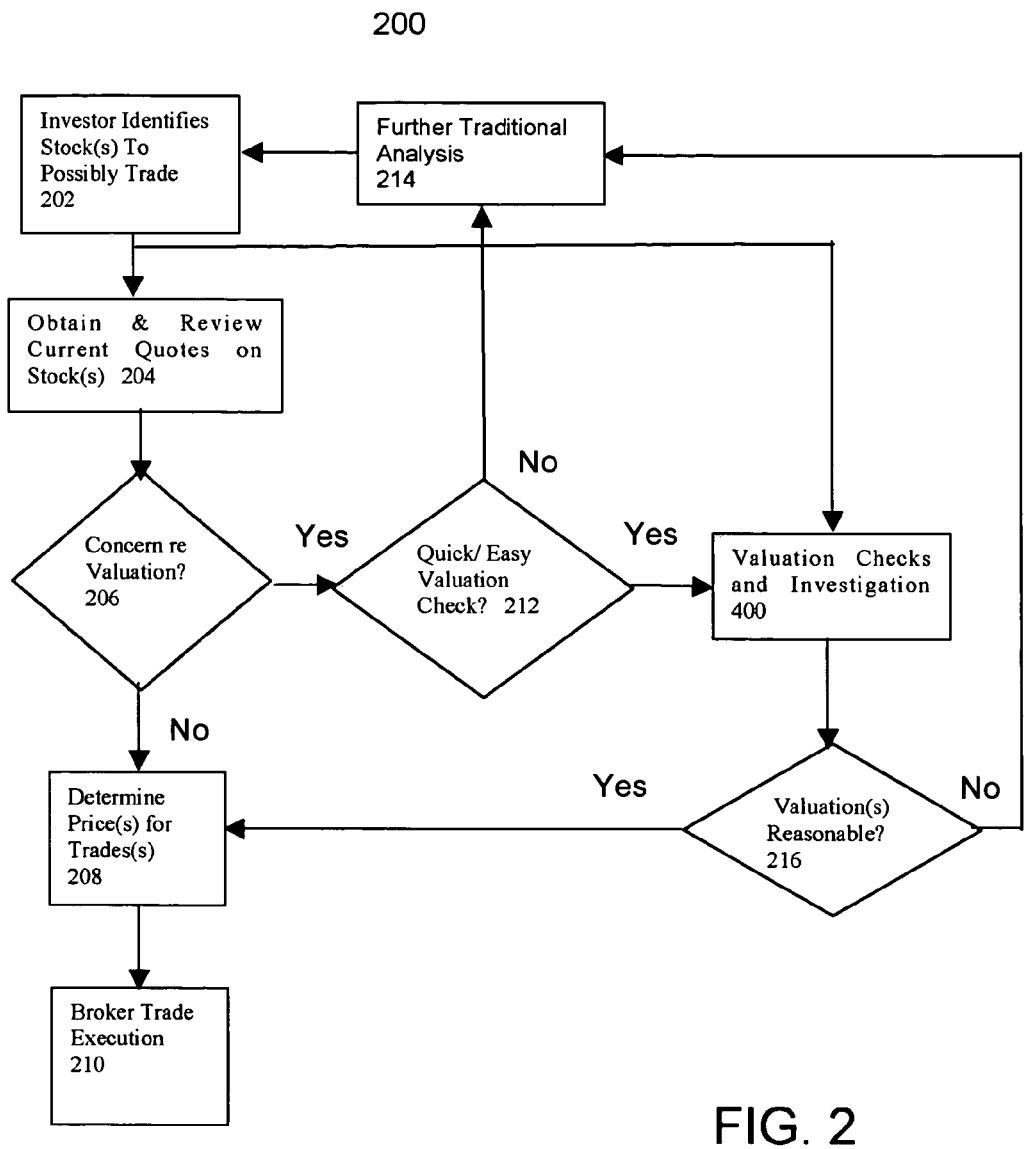
FIG. 2 illustrates an example of an investor's basic security trading processes, according to one embodiment of the present invention.

In order to better appreciate how the valuation tools provided in accordance with the present invention may be integrated into an investor's trading decision-making process, it is helpful to review some simple examples of how those trading decisions may be made. Turning first to FIG. 2, a trading process 200 that illustrates several of the major decision points involved in deciding whether or not to buy or sell a particular asset is illustrated (stock trading is used as the basis for most of the examples used to explain the present system, in order to make the system more understandable to the reader, but as previously emphasized the present system's use is not limited to stock assets). This diagram is not meant to illustrate every activity that an investor will or might perform in making such a buy or sell decision, rather it is intended to show how the present systems and methods for determining a fair value of an asset may be integrated into such a decision-making process, in some cases by supplanting complex and time consuming manual valuation determinations.

Beginning at step 202, the investor identifies a particular stock or asset that he or she is interested in buying or selling. This decision may be made on a myriad of factors, including recommendations from professional financial advisors or colleagues, a review of business or other information or simply a random selection. Whatever the reason for making the decision, the investor will usually begin his/her analysis by obtaining a current quote for the asset (step 204). Sometimes this quote will be a single data point and other times it will include some historical information concerning the stock's or asset's price and trading activity over some period of time. Based on that information, the investor may or may not have concerns over the asset's valuation (decision point 206). Value is a concept different from price. Whereas price reflects the currently sought amount (usually expressed in dollars or another currency) for a given unit of an asset (e.g., one share in a company's common stock), value is a more qualitative metric that represents what an investor considers to be the worth of that asset (with different investors potentially having different concepts of worth for the same asset). Generally speaking (and ignoring for the moment the many other factors involved in a decision of this type), an investor is comfortable with the purchase of an asset if its current price is below what that investor considers its value to be (with the expectation that the interim cash flows and later sale of the asset are worth more than the current price). Conversely, an investor will usually be comfortable in selling an asset if it is believed that the present value of interim cash flows and its eventual sale are lower than its current price.

If the investor has no valuation concerns, he or she may simply proceed to determine a price they will propose for the trade (purchase or sale) at step 208 and then personally or through his/her broker try to execute the trade at that price (step 210).

Sometimes, however, investors do have concerns over an asset's valuation. Hence, rather than simply proceeding with the trade the investor will want to make further checks on the asset's valuation. At step 212 then, the investor is confronted with the problem of determining whether to go backwards and conduct conventional manually intensive valuation analyses 214, or to use the present system's relatively quick and easy semi-automated processes to attempt to resolve valuation issues 400. As indicated above, conventional broker systems do not offer good automated tools for investors to quickly resolve valuation concerns, so those investors that need to perform such checks are normally left with having to execute the time consuming, often complex and manually intensive task of valuing a stock or other asset (step 214). Only after having done so will most investors complete the trade, after they have properly resolved their valuation concerns.

In contrast to this traditional highly manual valuation approach, the present invention provides investors with relatively quick and easy processes for resolving most valuation issues. At step 400 the investor is allowed to access valuation information produced in accordance with the present invention. Such access is gained through one of the investor's existing investment information service provider's communication portals, such as a web site or other resource, a special purpose web site to access such information, or through use of software resident on the investor's own computer to develop and/or retrieve the information. In any or all of these instances, various embodiments of the present invention allow for "single action" or "one-click" access to the valuation information in much the same way as other computer-implemented processes can be activated through similar interactions with computer-based input devices.

Having thus obtained the valuation information through this easy to use and rapid response mechanism, the investor can decide for him/herself whether or not issues related to the asset's valuation are resolved (step 216). If so, the investor can proceed to execute the transaction. Otherwise, the investor may go back to performing further conventional analyses 214 or select different assets for trading consideration 202.

It should be noted that although the above discussion was based on an analysis of a single asset in other embodiments of the present invention the analysis and/or trading decision(s) might be performed for a number of assets simultaneously or concurrently. The present valuation tool is configurable to accommodate the valuation and comparison of multiple individual assets at one time, and can even automatically support valuations of entire portfolio, as discussed further below. An investor's concurrent evaluation and valuation of multiple assets normally would utilize all of the valuation capabilities needed for evaluating individual assets, but would also emphasize expanded detail valuation comparisons of the selected assets. Hence, the single asset embodiment example described above should not unduly limit the scope of the present invention. Further, as shown in this illustration, an investor may proceed immediately to the valuation check 400 in lieu of first obtaining quotes, etc.

Figure 3:
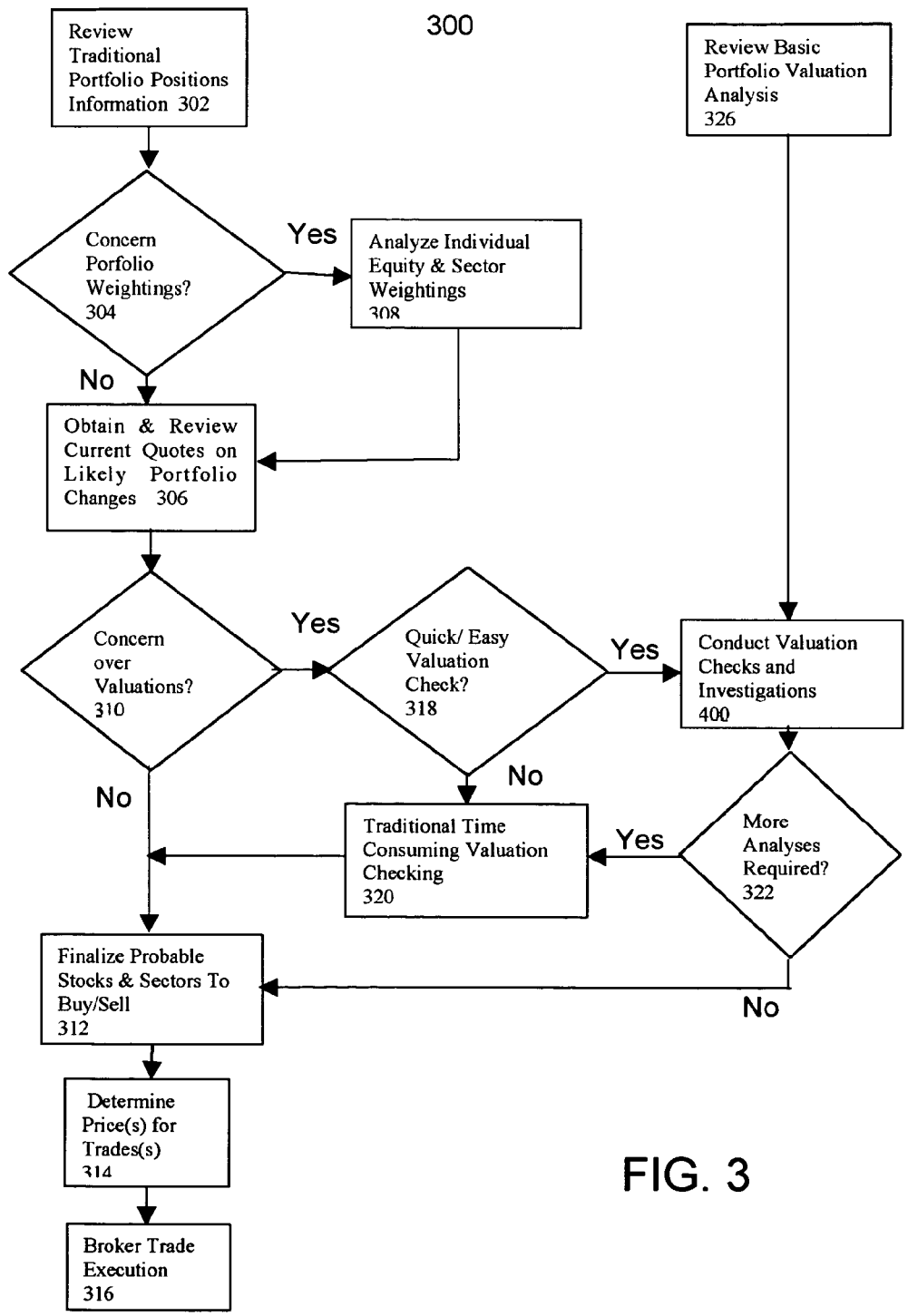
FIG. 3 illustrates an example of an investor's activities during a portfolio valuation review according to one embodiment of the present invention.

Turning now to FIG. 3 a process 300 that illustrates certain steps involved in reviewing a stock (or other asset) portfolio in order to decide whether and/or how to change the structure of that portfolio is shown. Typically such a process begins (step 302) with an investor reviewing current portfolio position information. This may include, for example, a list of currently held stocks, bonds, etc., and their present price. In some cases, the portfolio information may also include historical information that allows the investor to determine present gains/losses. If at any point in overall process 300 the investor either becomes comfortable with the portfolio's current status, or does not want to further evaluate or make trading changes to it, he/she will normally end the portfolio review process at that point. If the investor wants to consider making changes to the portfolio he/she will normally proceed further along overall process 300.

Based on this initial review, the investor may or may not have concerns over the composition or various weightings of his/her portfolio (decision point 304). That is, the investor may have concerns regarding the relative amount of each asset that is present in the overall portfolio. If no such concerns exist, the investor can proceed to obtain traditional quotes (step 306) on trading changes to the portfolio that the investor is contemplating. However, if the investor does have concerns over the portfolio weightings, he/she will likely choose to analyze, in a conventional manner, various individual and/or sector weightings to better understand how to resolve those concerns (step 308).

Once an investor is ready to finalize his/her decisions on their contemplated changes, the question often turns to whether he/she has concerns over the valuations of the assets under consideration (step 310). If the investor has no concerns over asset valuations, he/she can immediately proceed to finalize the buy/sell decisions (step 312), determine prices at which he/she wants the trades to be executed (step 314) and personally or have a broker execute the trade (step 316). Sometimes though, the investor will have valuation concerns. If no quick and easy process for checking on those concerns exists (see decision point 318), the investor is forced to spend time on conventional, time consuming and tedious manual approaches to determining valuations (step 320) in an attempt to satisfy those concerns before proceeding.

In accordance with an embodiment of the present invention, however, the investor is provided with the necessary tools for performing fast and easy checks on asset valuations. More specifically, at step 400 the investor is allowed to access the valuation information produced in accordance with the present invention. Such access is gained through one of the investor's existing investment information service provider's communication portals, such as a web site or other resource, a special purpose web site to access the information, or software resident on the investor's own computer. In any or all of these instances, various embodiments of the present invention allow for "single action" or "one-click" access to the valuation information in much the same way as other computer-implemented processes can be activated through similar interactions with computer-based input devices.

Having thus obtained the valuation information through this easy to use and rapid response mechanism, the investor can decide for him/herself whether the valuation issues have been resolved, or whether further conventional valuation analysis is needed (step 322). If no further analyses are required, the investor can proceed to execute the contemplated transactions. Otherwise, the investor may perform further conventional analyses or select different assets for consideration.

Note that an investor can alternatively choose to start process 300 by seeking a portfolio valuation analysis in the first instance (step 326), rather than by selecting traditional portfolio information. In some cases this may be the most efficient way to start the process for investors that are highly interested in their assets' valuations. This new procedure for obtaining valuation information for an entire portfolio of assets can be accomplished through a only a single investor information request action within step 326, and such a feature may be integrated as part of a third party or dedicated service provider's web site and/or an investor's own computer system. In response to this request detailed valuation and rating information for the entire portfolio is provided, obviating the need to seek that information for each asset individually and making the investor's analysis and comparison efforts much more effective and efficient.

Valuation Investigation Tools Deployment Options

As indicated above the present valuation tools may be accessed in and through a variety of situations and channels. In one embodiment neither broker nor investor computers have the present system's tools and databases residing permanently on their computers, instead they simply pass the investor to the investment tool's servers (ideally with contextual data). In another embodiment, the tools are primarily accessed directly through a third party service provider's web site or other communication portal, without going to the investment tool's primary servers. For example, the present valuation tools may be accessed through the web site of a brokerage firm, wealth management firm or other service provider with which an investor already has an existing relationship, and where that service provider has decided to provide their investors with access to these tools on their servers. Allowing such access may be beneficial to: the investment tool's service provider because it reduces the processing demand for such services at the provider's own web site, and to the broker and/or investor because it eliminates the need to transfer investor and information to investment tool service providers.

Valuation Investigation Options

Figure 4:
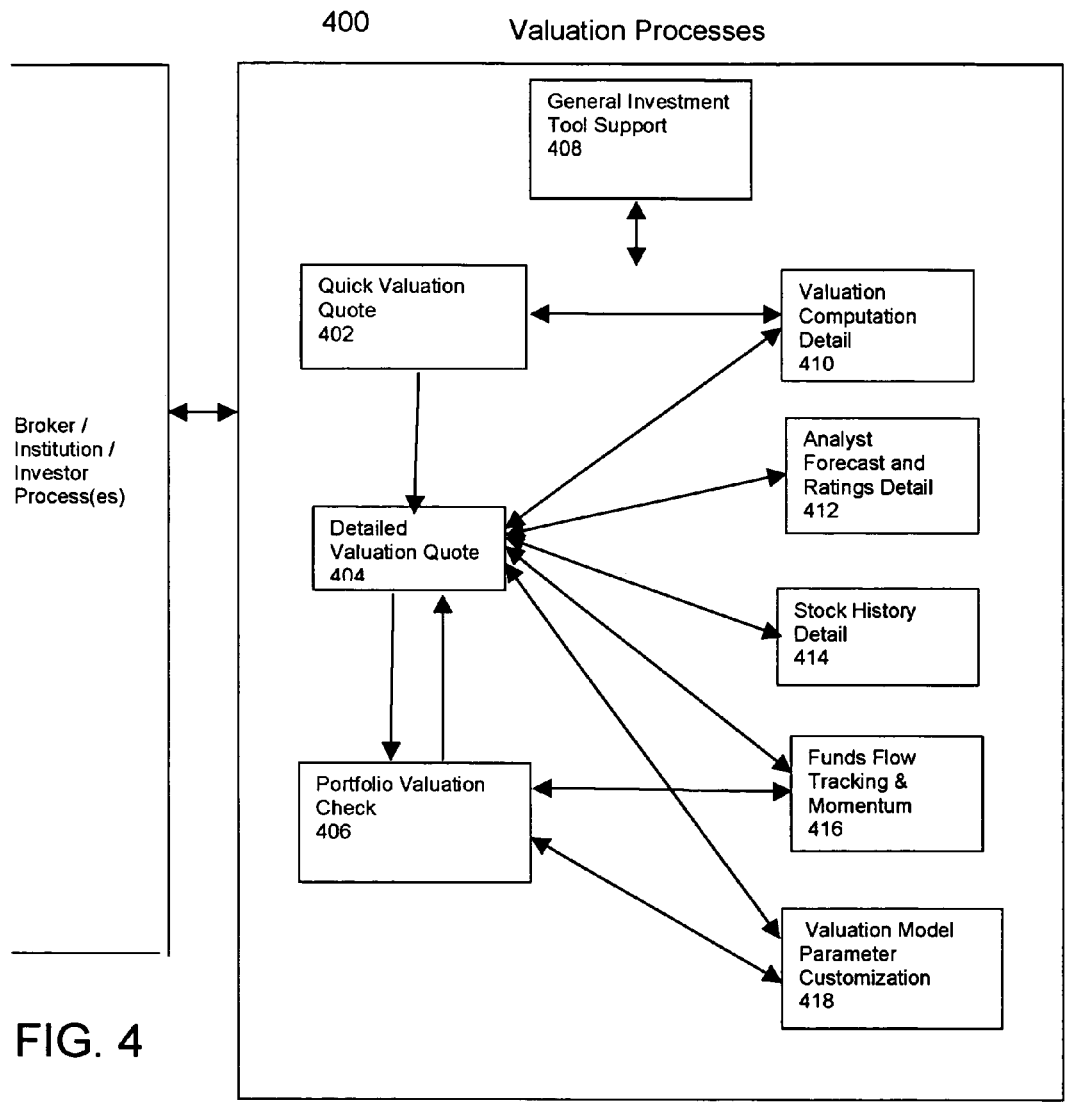
FIG. 4 illustrates an example of valuation checking and investigation processes, according to one embodiment of the present invention.

FIG. 4 illustrates several methods 400 for utilizing the present valuation tools. In each case, access may be made through a third party service provider's web site, through a dedicated valuation tool service provider's web site, or through resident software on the investor's personal computer or a computer system.

In general, investors are expected to utilize the present system primarily through three key access processes in this embodiment of the present invention. The "Quick Valuation Quote" process 402 returns a summary of valuations and/or ratings developed by the present investment tool in response to a single action by the investor. The "Detailed Valuation Quote" process 404 returns detailed valuation and/or rating information based on a single action by the investor, and may also provide the investor with certain valuation statistics that impacted the calculated valuations. This process may also allow the investor to choose alternative valuation factors and/or models. The "Real-Time Portfolio Valuation Check" process 406 returns detailed valuations and/or ratings for an entire asset portfolio based on a single action by the investor, and may also provides an investor with certain valuation statistics that impact the computed valuations and allow the investor to choose alternative valuation factors and models. From these processes investors may access other sub processes in only a single action, by simply clicking on options or command buttons displayed in one or more user interfaces.

Any or all of the above valuation processes may be used in connection with the trading or portfolio review processes described above. For example, any or all of these accesses may be available during the valuation checking in the basic trading process 200, the valuation check in the portfolio review/trading process 300, and/or as part of any multiple security valuation review variation of those processes.

In those situations where the access processes and tools operate on a web site separate from the investment service provider's (e.g., broker's) web site, automated processes automatically extract the investor portfolio and/or asset information needed by the present investment tools from the service provider's database, securely pass that information to the valuation tool's server(s), which then return(s) the valuation/rating results to either the investor or the service provider site (for display to the investor). Such a process may be conducted seamlessly from the investor's point of view, with the investor needing only to initiate the valuation analysis (e.g., by selecting an appropriate icon or other indicator using a mouse click or other cursor control action), without subsequently entering any information for the valuation tools. In other embodiments where investors are not using broker systems that automatically link to the present system, investors will normally have to go through a login or other security process before any access to the present system's tools are possible, or information could be automatically requested from their broker's site (so as to ensure that the investor truly is authorized to use the tools or request such data transfers). These and other forms of conventional Internet site security may be implemented in conjunction with deployments of the present invention, and because they are well known among Internet users in general and web site operators in particular they will not generally be described further herein. Where broker systems pass the investor and their data servers hosting the present investment tools, normally the investor will be returned to the broker system immediately after they are finished using the present tools.

Investors can also choose to be less structured in their utilization of the present investment tools, by invoking the investment tool's general support process 408, which may provide either free form or menu-structured access to any or all the individual valuation tools. Investor processes on broker systems may also optionally link investors to this more general process, and once again after valuation investigations have been completed investors will normally return to the broker systems. The investment tools general support processes 408 are capable of interacting with virtually all of the present investigation processes.

The preceding key valuation and investigation processes are supported by a number of optional sub-processes that allow investors to further investigate valuation issues. These sub-processes may include: a "valuation computation detail" review process 410, an "analyst forecast and ratings detail" process 412, a "stock history detail" process 414, a "funds flow tracking & momentum" processes 416, and/or a "valuation model parameter customization" processes 418. These processes help the investor better understand and tailor the information returned/presented by the key valuation processes, resulting in improved investor confidence regarding a asset's or portfolio's valuation. The valuation checking and investigation methods are capable of interacting with one another dynamically and in a variety of ways.

The "valuation computation detail" review process 410 returns the detailed valuation computations associated with a combination of a valuation model and a set of valuation and buy/sell scenario parameters. An example of the output from such a process is shown in FIG. 11. In this example, a stock (GE) is under consideration by an investor. The stock's ticker symbol 4102 and current price 4104 are displayed. Presented in section 4106 is an expected cash flow breakdown that is computed by the present valuation model based on the investor's "discounted cash flow buy/hold/sell model" and its associated valuation parameters. In this example it is assumed that the investor will buy the stock at its present price, hold it for five years and then sell. The investment's expected price when sold and its interim cash flow distributions are determined by the valuation model based on a combination of data from third-party information providers and supplemental historical statistics (computed by the present system), relating to the stock's expected performance. In the example those cash flows are discounted on a pretax basis based on an investor customizable expected rate of return of 10%. A second section 4108 summarizes this information and presents the computed over/under valuation based thereon. As indicated in this example, the stock has been found to be undervalued by about 11%. A third section 4110 lists other parameter values that were used in modeling the above-described valuation, some or all of which may be reconfigurable by the investor. For example, the user may choose to select a valuation model other than a discounted cash flow model to see how the prediction under that model compares to the present model. Alternatively or in addition, the investor may choose to change the expected rate or return or other parameter(s) to determine the valuation's sensitivity to that parameter.

The "analyst forecast and ratings detail" process 412 enables investors to examine forecasts and ratings of one or more investment service providers in further detail, and also highlights how well analyst forecasts have historically performed in predicting the stock's future earnings. An example of the information returned by this sub-module 412 is shown in FIG. 13. Investors may select a period of time over which to review the analyst information, for example, quarterly, semi-annually, annually, etc. Based on this selection, a first section 4120 will display a variety of both historical and forward looking earnings forecasts, earnings growth rate forecasts, analyst price targets, stock ratings, and/or other information regarding the stock or other asset of interest. Of course such information can only be displayed if it is available. The information may be culled from a variety of sources, for example subscription-based and/or free investment advisor databases. A second section 4122 then allows the investors to review historical averages relating to the analyst forecasts and price target surprises, and to historical stock ratings. Such a sub module is useful as a means of providing an investor check on the historic quality information generated by analysts and other third parties that often ends up being used in valuation computations.

The "stock history detail" process 414 allows investors to review a detailed asset performance history on which historical averages are based, understand what the actual rate of return was on the asset was in the past, and to adjust the methods used in computing averages. An example of the information returned by this process is shown in FIG. 12. Presented in the bottom section 4140 is the valuation model's (in this case a discounted cash flow model) computation for the asset's actual historic rate of return based on the actual average stock prices and actual interim cash distribution that occurred during the periods being valued by the model. In this example, the GE stock would have returned 3.4% based on a buy/hold/sell investment from 1998 to 2003, and 21.6% based on an investment from 1993 to 2003. The actual historic average stock prices, earnings per share, dividends, and P/E's are presented (e.g., on a year-by-year basis) in section 4142. Section 4144 presents historical averages of key valuation statistics for selected time periods, which are frequently available for use in the present system's valuation models.

Figure 17:
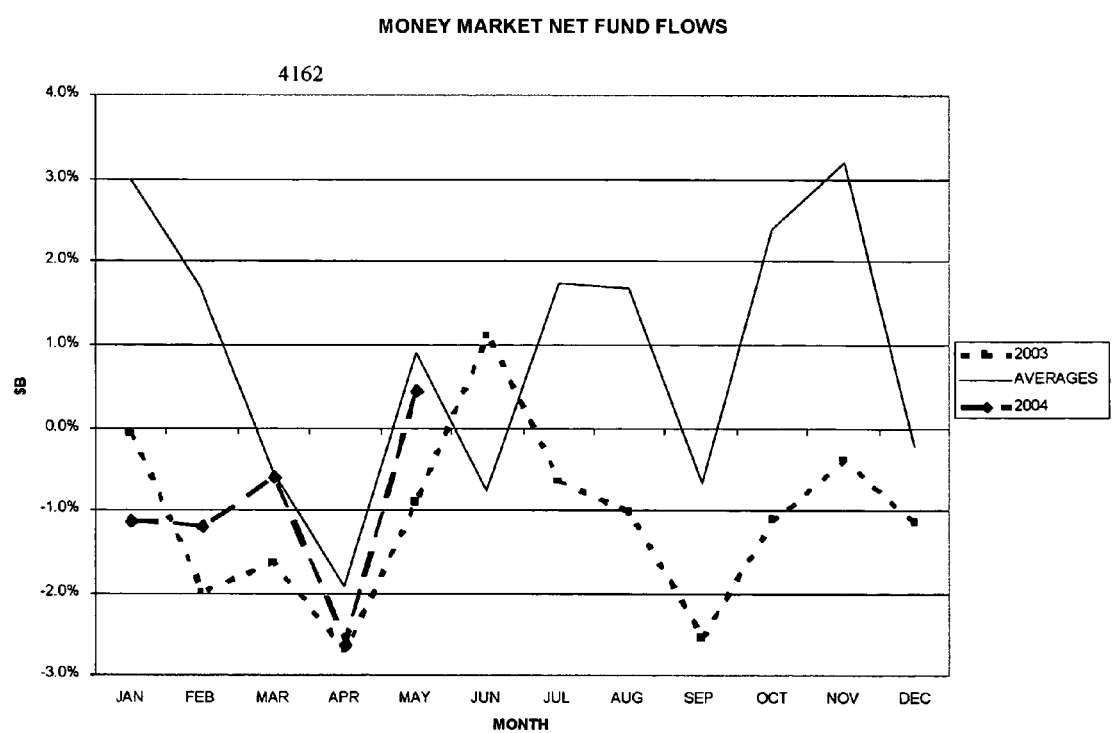
FIG. 17 illustrates an example of a graph produced in accordance with an embodiment of the present invention for mutual finds flow statistical information.

The "funds flow tracking & momentum" processes 416 enable investors to review the overall levels of investment and net inflows/outflows that are occurring in mutual funds and money market funds. As illustrated in FIGS. 16 and 17, various graphs 4160 and 4162, respectively, may be presented to show fund inflows/outflows for selected time periods and/or fund categories. In some embodiments, the present valuation tools may also provide information relating to: a period's net inflow/outflow percentages (relative to a fund category's beginning asset balances); how that compares to the period's average historical inflow/outflows for the selected period; and a unique "funds flow momentum index" may also be computed and displayed for the investor.

The "valuation model parameter customization" processes 418 provide a facility for both the present system and an investor to personalize the types of data that will be the source of parameters to the various valuation models used in accordance with the present invention. In addition to complete customization, the present invention allows users to opt into/out of default investor categories associated with preconfigured sources of inputs and risk profiles. FIG. 15 provides an example of an input/output interface 4180 through which an investor may select the personalization or default choices. Among the factors that may be customized are: investor identification; investor category; rates of return, cash flow & tax treatments; valuation method; tax brackets/percentages; asset holding times; P/E ratios at which to sell; dividend percentages; earnings per share growth; etc. This interface may make use of conventional components such as drop down lists, text boxes, radio button selection objects and check boxes to accommodate the various investor options. Through this module 418 investors have the ability to tailor the valuations produced by the present invention to better simulate their investment preferences, allowing the investors to make investment decisions that are more consistent with those profiles.

It should be noted that the quality of most investment models' stock valuations is highly dependent on the quality of the statistics being used by the models. Historical statistics are not a perfect predictor of the future, but they are a helpful base upon which investors can establish an understanding a stock's historical performance trends, and are particularly helpful in making investment comparisons between several assets. Investors can utilize the combination of these historical trends, analyst's forecasts, and their knowledge of how the company is expected change in the future, to critique and adjust the standard statistics used in the models so that they are as rational as possible.

The "stock history detail" process (an example of the output of which is shown in FIG. 12) enables investors to see the historical detail on the performance of the stock, review a number of different computational averages that can also be used by the investment tool's models, and understand what the stock's past rates of return would be if the actual historical data were used as inputs to the present investment tool's standard valuation model. In the example, GE returned 3.4% based on buying in 1998 and selling in 2003, and 21.6% based on buying in 1993 and selling in 2003. If an investor wants to see how a stock's returns compared to others, they can graph the results, for example, by downloading the information to a conventional spreadsheet application or by running a graphing tool available via the present investment tools.

The "analyst forecast and ratings detail" process (an example of the output of which is shown in FIG. 13) enables investors to review the forecasts and ratings of investment service providers in further detail, and also highlights how well analyst forecasts have historically performed in predicting the stock's future earnings. Investors would usually examine annual statistics, but would have the option of reviewing the information on different time scales, such as quarterly, semi-annually, etc. The investment tools will display a variety of both historical and forward looking earnings forecasts, earnings growth rate forecasts, analyst price targets, and stock ratings. Investors are also able to review historical averages relating to analyst forecast and price target surprises, and to historical stock ratings.

Figure 14A:
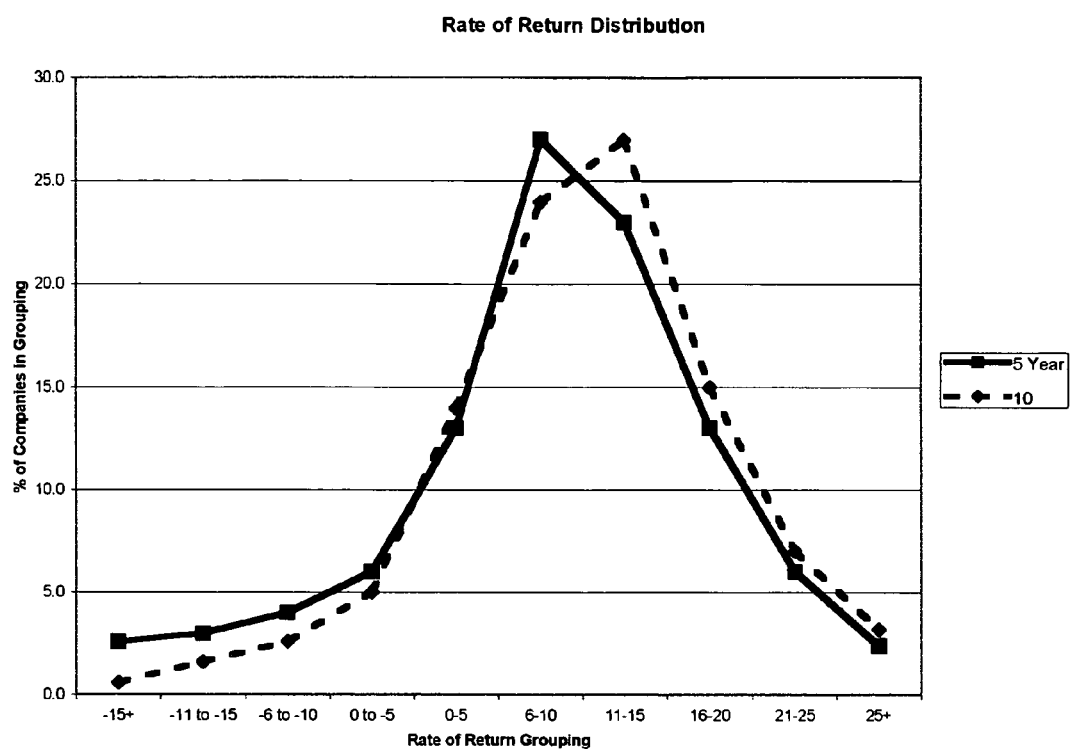
FIG. 14a illustrates an example of an asset rate of return distribution graph produced in accordance with one embodiment of the present invention.
Figure 14B:
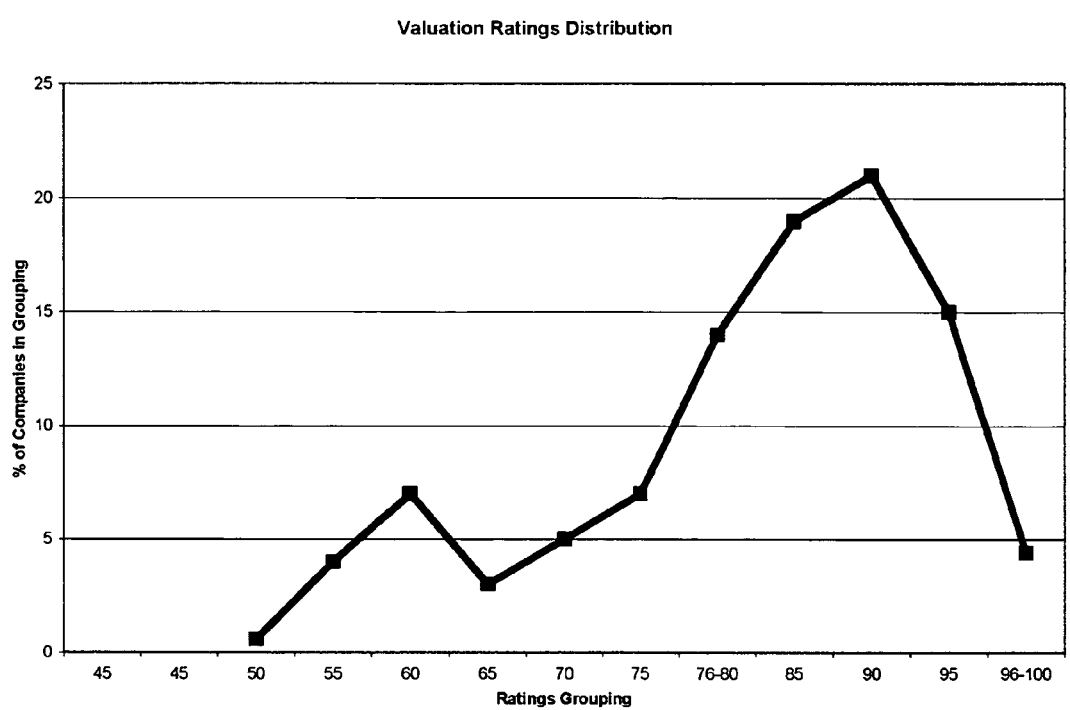
FIG. 14b illustrates an example of an ratings distribution graph produced in accordance with one embodiment of the present invention.

An additional benefit provided by the present invention is reflected in the rate of return distribution graph, an example of which is shown in FIG. 14a. This graph allows investors to see the rate of return distribution for an overall market (e.g., S&P 500), or industry group at a glance. Similarly, a "ratings distribution graph", such as that shown in FIG. 14b, allows investors to see the ratings distribution for an overall market, or a stock's industry group. With such graphs investors will be able to better understand the rates of returns and ratings that have been achieved by groups of stocks, and better evaluate a given stock's rate of return/rating percentile position.

Linkages and Interactions Between Computer Systems

As discussed above, the present methods and systems may be delivered to investors as optional processes that can be exercised "on-demand" in cooperation with (or independently from) other computer-based investment systems. Where appropriate, the present valuation tools may be accessed through existing broker systems operated by third parties, for example as a service differentiator for their customers. Although Internet-based access may be a very convenient means for providing such access, it is also possible that some vendors may choose to provide these valuation services through proprietary or other non-publicly accessible networks (e.g., to their analysts and investment advisors rather than to their customers at large). In other cases, broker systems or investor systems may be configured so as to have most real-time aspects of the valuation tool operating on its own servers. In those cases, a subset of the investment tool's systems and databases would be resident on the broker systems or the investor computer, as applicable, and would likely require updating a few times a day.

Figure 5:
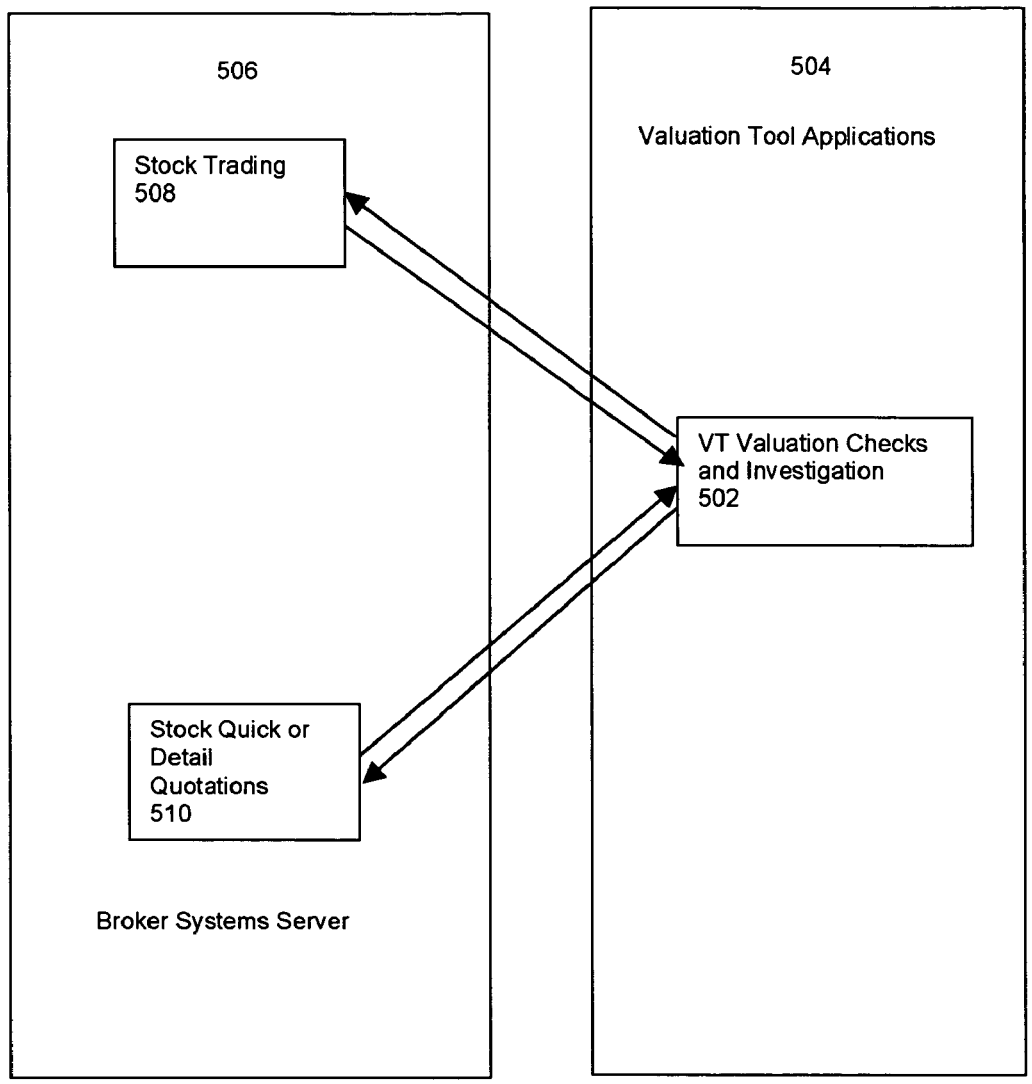
FIG. 5 illustrates an example of linking between various computer systems during asset valuation processes according to one embodiment of the present invention.

Regardless of how the services are deployed, however, it is likely that there will need to be some inter-process communication between elements of one or more broker system and the present valuation tools. For example, periodic transfers of at least modest amounts of data between various computer systems will likely be necessary on daily, weekly or other basis. FIG. 5 illustrates one such example where the present valuation tools are used in the context of a stock or asset trade or quote activity originating and primarily executed on a broker system. In this example the present valuation tools 502 are instantiated on a separate server or other computer system 504 accessible by a broker system 506. The broker system 506 includes a stock trading engine 508 and/or a stock quote engine 510. When an investor using that stock trading engine 508 or the stock quote engine 510 wishes to receive valuation information as part of a trading decision or information request, that investor and sufficient information for the valuation tools to deliver the valuation information to the investor are passed from the broker system 506 to the valuation tools 502. After the investor completes his/her investigations he/she may be returned to the broker system 506, and optionally some valuation information might be passed from the server 504 to the broker system 506. Depending on the type of valuation analysis to be performed, in one implementation the information sent to the valuation tool 502 may include some or all of the stock symbol(s) (or other asset identifiers), most current prices, and some form of investor ID. In other implementations the broker only needs to transfer the investor to the tools and send no data, but in those cases the investor will have to enter data that might otherwise have been automatically shared.

In still other implementations, the broker system 506 and server 504 at which the valuation tools are deployed may only exchange the user session, and not automatically pass the data needed to perform the valuation calculations. That is, the user may be passed from one server to another as part of a secure or other Internet session, with or without notification of the transfer. The session passing may be involuntary (e.g., where the investor is passed between the servers involuntarily as a result of requesting the valuation) or voluntary (e.g., where the user opts to visit the valuation server 504 by selecting a hyperlink or other element rendered in a web browser. In such situations the investor may be required to independently enter information needed for the valuation analysis at the valuation server site that was available from the broker site (if that information is not transferred in context with the investor session, so as to automatically populate one or more web forms through which such information may be utilized by the valuation tools). After completing the valuation analysis, the investor would normally return to the broker system (preferably in the context from where the initial session referral was made) through selection of appropriate "return" or "end valuation investigation" commands, hyperlinks or other means.

Figure 6:
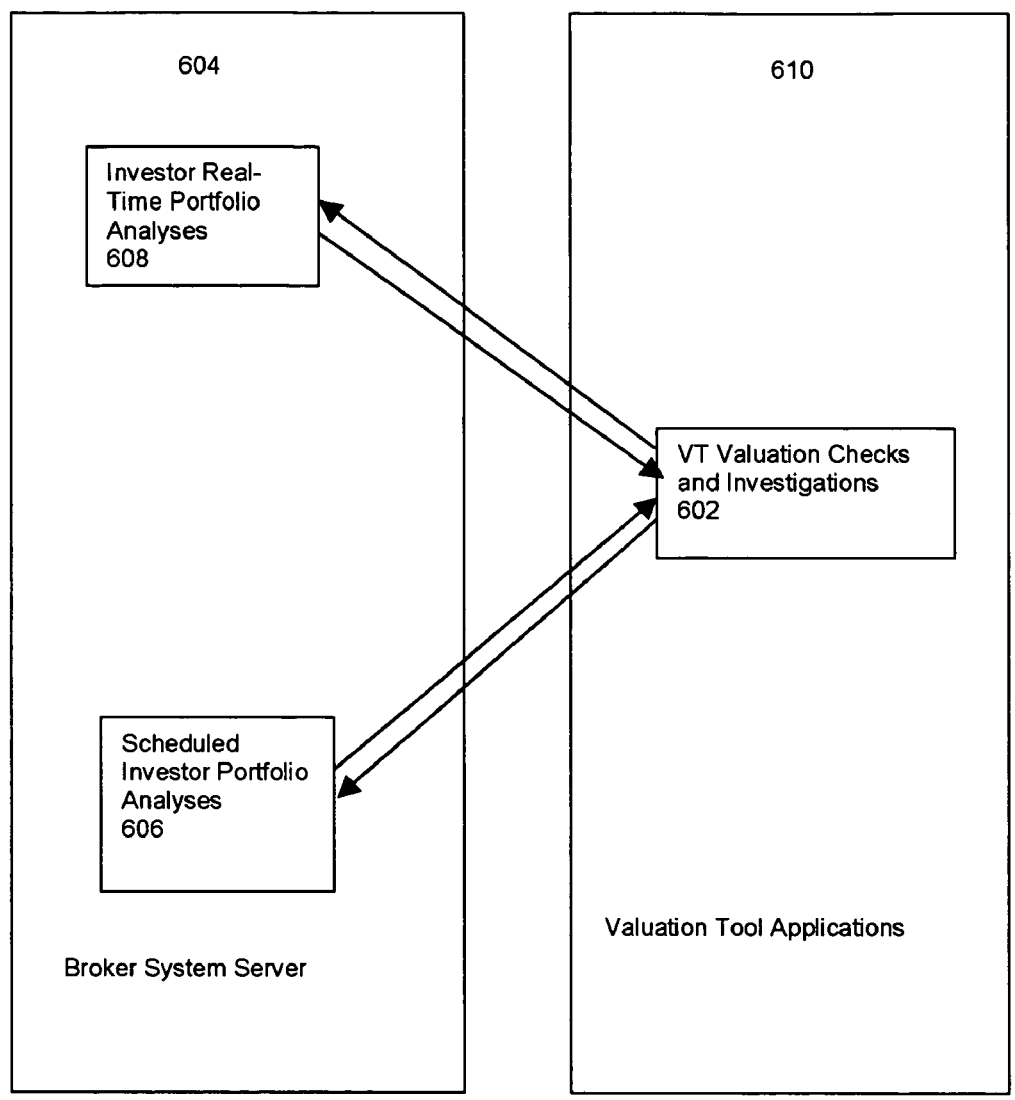
FIG. 6 illustrates an example of linking between various computer systems during asset portfolio valuation processes according to one embodiment of the present invention.

FIG. 6 illustrates similar interactions between the valuation tools 602 and broker server 604 in situations where an investor wants a portfolio valuation summary. Such situations may arise in the context of a scheduled portfolio analysis 606 or a request for a real time portfolio analysis 608. As above, either or both scenarios may involve simply a data transfer and/or a user session transfer. Generally, for scheduled periodic summaries the broker computer 604 may send to the valuation tool 602 all of the information required to compute a portfolio valuation summary and then choose to either: receive back (on a periodic or other basis) one of the portfolio valuation summary reports discussed herein and/or data that the broker system 604 would distribute to the investor; or have the valuation tool server 610 transmit such a summary or other data files directly to the investor (e.g., by email or other means).

For real-time summaries the preferred option is for broker system 604 to automatically send the valuation tool server 610 information regarding the investor's stock (or other asset)

positions and allow the investor to interact with the present system's tools without having to do any data entry regarding the portfolios positions. If the broker systems desire any feedback, it would ideally be in the in the form of a data transfer or report at the end of the session. However, as indicated above an alternative is transfer the investor session (preferably in context) to the valuation tool server 610; await the investor completing the portfolio review valuation investigations; and then transfer the investor session back to the broker server 604 (again preferably in context).

Individual Stock and Portfolio Valuations

As discussed earlier with reference to FIG. 4, several options are available for investors when using the present valuation tools. One such option is a "Quick Valuation Quote". FIG. 7 now illustrates an example of how the results of such a quote may be presented to an investor as part of a quick quote screen 700. Quick quote screen 700 includes a limited amount of information that can enable investors to quickly determine whether an asset (in this example a stock) may have valuation issues. Such information may include: the asset's trading symbol or other identifying information 702; its present price 704; its recent price changes (and/or min/max) 706; various simple valuation metrics (such as historical price to earnings ratios, or price to rents ratios) 708; over/under valuation statistics; and other metrics 710 and/or ratings 712 computed in accordance with the present invention. While some of this PE type information is available through conventional investment tools (such as conventional broker systems), it is rarely provided as part of those tool's simplest quick quotes, and therefore an investor must go through multiple steps to obtain it. The valuation and rating information provided by the present invention is virtually never included in conventional system's simplest quotes, and the addition of this information to a quick quote provides extremely efficient and meaningful metrics upon which investors can more quickly and effectively determine whether they have potential valuation issues with respect to the asset.

As described above, the quick quote information may be obtained in any of a variety of ways, including selecting an appropriately labeled link or button displayed at or through a conventional broker system. For example, existing broker systems may be enhanced to include a "Quick Valuation Quote" button (or similar interface object) that, upon selection by a user, automatically results in the valuation information being computed and displayed in quick quote popup or window 700. The display may be generated at the broker system site or at a dedicated site associated with the valuation tool server as discussed previously. Desirably (but not necessarily) a user may be able to select the quick valuation quote, have all of the necessary information automatically transferred, the valuation computed and the results displayed all in response to a single user action, such as a mouse click or other cursor control event through which the quick valuation quote user interface element is selected, toggled or otherwise actuated. The quick valuation quote may be an optional service offered to some or all of a broker system's customers in conjunctions with other, conventional or innovative services (such as those discussed herein).

Obtaining quick valuation quotes may be especially useful for investors to supplement their other conventional activities, such as obtaining conventional quick quotes regarding current stock prices, obtaining detailed stock price quotes, participating in stock trading activities and/or conducting portfolio reviews. Easy access to the present system's quick valuation quotes may be provided from user interfaces associated with any or all of these (or other) conventional activities provided by broker systems. For example, appropriate user interface elements may be deployed at some or all of these user interfaces so as to allow access to the quick valuation quote in a fashion similar to that described above.

Examining the example quick valuation quote illustrated in FIG. 7 in further detail, one can recognize that such a quote provides multiple valuation statistics, which are generally unavailable in conventional quick quotes regarding stocks or other assets. Such information includes both historical and "model computed fair value" price to earnings (P/E) ratios. While the much of the P/E information related to the past and next few years may be consolidated from existing information sources (and may even be available to investors willing to go through multiple steps in some conventional broker systems), it is virtually never presented in their highest level quotes (which makes it inefficient for investors to access). The fair P/E ratio (or, selectively, the fair price), over and under-valuation metrics, and valuation specific grades, ratings and performance percentiles provided in accordance with the present invention are unique valuation metrics to highest level quote (based on modeled performance expectations for the asset under consideration and reflecting the investor standard or previously established investor-customized valuation preferences). Together (or even if considered in isolation), these valuation metrics provide investors with extremely useful valuation information that they can use in quickly evaluating whether an investment opportunity has obvious valuation issues which should be investigated further. This enables investors to more quickly focus their energies on the best opportunities and to limit their efforts or investments on obviously overvalued assets.

An additional area of information provided in accordance with the present invention includes the valuation ratings information 712 previously identified. This may include such valuation specific information presented in the form of grades, ratings, and comparable investment percentile ranking (in each case determined based on predetermined evaluation criteria and scales). Percentile rankings of assets would compare the performance of similar assets in various predetermined categories). The manner of determining these rankings is described further below. The rankings will emphasize the valuation modeling results provided in accordance with the present valuation methods. In some cases the ratings and rankings may also include weighted average third party ratings in addition to the ratings and ranking compiled by the present invention. Together with the other valuation information presented in the quick quote format, these criteria may allow investors to determine whether or not the asset under consideration passes the investor's valuation criteria or whether further investigation is warranted.

The quick quote information provided in accordance with the present invention thus gives investors easy access to valuation information that conventional quick quotes do not. Most conventional quick quotes concerning stocks, bonds or similar assets focus on providing limited information concerning the asset's current price and trading activity. Often, even basic valuation information (such as historical P/E ratios) is not provided. In contrast, the quick valuation information provided in accordance with the present invention (including but not limited to the estimated "fair value" of the asset) immediately provides the investor with a rich suite of valuation indicators upon which informed trading decisions can be more effectively based.

In addition to providing the valuation information, the quick valuation quote screen 700 may, in some embodiments, also include facilities for users to share and transmit the valuation information to others (such as investment advisors, etc.). For example, a user interface element (such as a button or other element) 714 may be included such that upon selection of this element 714 (e.g., through a mouse click or other cursor control action or event), an e-mail or other communication application (e.g., an instant messenger application) may be launched at the user's computer system so as to facilitate communication with the user's investment advisor and/or other selected individuals or institutions. In other cases, rather than launching the communication application at the user's computer system, a communication system at the computer system at which the valuation tools are hosted may be invoked. In either case, and as is common in the art, the selection of the user interface element 714 may pre-populate an e-mail or instant message with certain information (such as form text and/or the information extracted from the quick quote itself) as well as an addressee (e.g., an addressee preselected by the investor to receive such messages). This will allow the user to quickly communicate the quick quote information (along with any other information the user chooses to include in the message) to the recipient, improving the investor's ability to efficiently communicate with their fellow investors or investment advisors. This type of highly efficient investor communication capability is not limited to quick quotes and can provided by the present system for almost any of its valuation processes.

After having completed a review of the quick valuation quote information, the investor may return to the broker system from which he/she was transferred or referred by selecting an appropriate user interface element, such as button 716. By selecting the "Return" button 716, the investor is returned (preferably in context) to the broker system session (if a session transfer was made) or broker system screen (if no session transfer was made), as applicable, from which the quick quote was requested. Alternatively, if the investor wishes to review further details of the valuation information, he/she may select an appropriate user interface element such as the "Full Valuation Quote" button 718 (which will provide the user with a full valuation presentation similar to that discussed below with reference to FIG. 8), or the "Valuation Investigations" button 720 (which will allow the user more free form access to the present system's valuation tools). Note, some or all of these user interface elements may be included with any or all of the information display screens, charts, graphs and/or other elements described herein.

A second option available for investors when using the present valuation tools is a "Detailed Valuation Quote". FIG. 8 now illustrates an example of how the results of such a quote may be presented to an investor as part of a detailed quote screen 800. Detailed quote screen 800 includes a variety of information concerning an asset (in this example a stock), for example, the asset's trading symbol or other identifying information 802, a summary of various valuation information 804, detailed valuation factors utilized in computing valuation ratings and other metrics 806, summaries of third party analyst recommendations regarding the asset 808, and valuation ratings 810 computed in accordance with the present invention. While some of this information is available through conventional investment tools (such as conventional broker systems), it is often the case that the investor must perform multiple complex tasks in order to access the information and/or then manually compile his/her own summaries or other analyses to obtain the equivalent data. In contrast, the present valuation tools configured in accordance with the present invention provide access to such information through a single user action with a computer system (e.g., a single mouse click or other cursor control action). For example, the detailed valuation quote screen 800 and its associated information may be displayed to the user in response to user selection of an appropriately labeled user interface element, such as a "Get Detailed Valuation Quote" button or other similar element displayed at or through a broker system web site or investor resident computer application. Alternatively, or in addition, the detailed quote screen 800 and its information may be displayed in response to selection of the "Full Quote Valuation" button 718 displayed as part of the quick quote described above, or a similar user interface element associated with a portfolio valuation summary discussed below.

As shown in the illustration, the detailed valuation quote provides additional information concerning an asset's computed valuation that was not displayed as part of a quick quote. In addition, valuations based on both future and historical buy/hold/sell scenarios may be displayed (e.g., in a side-by-side fashion so as to enable better comparisons). The goal of the detailed valuation presentation is to help investors to quickly understand and compare the overall opinions of key ratings services, analysts, and valuation models; better understand, personalize, and compare possible alternative valuations of the stock; and/or, more deeply probe possible valuation issues which the investor might want to investigate. Where appropriate pull-down menus or other user interface elements can be utilized to quickly customize the valuation models, methods and factors being utilized. The precise choice of which information to display and the manner of its presentation is not critical to the present invention, but in some embodiments the following information is displayed:

consolidated summary prices, daily trading volumes, ratings, forecasts and price targets from a variety of third party investment services;

the computed "Fair Value" and "Historical Fair Value" P/E or price (together with an over/under valuation statement) based on valuation models selected by the investor (this may include the valuation models which are embodiments of the present invention or conventional valuation models, which in either case may be configured with personalized or non-personalized investment parameters); and information regarding the valuation method(s) and model(s) used to produce the statistics being displayed.

Further to this latter point, among the factors that are used by the present valuation models to develop asset valuations (which may be fed by system standard default or personally selected data sources) include: earnings per share growth rates (e.g., on forecasted and historical average bases); dividend yield percentages; estimated time periods for which the investor will hold the security; estimated stock P/Es or prices at time of sale; investor expected rates of return at which cash flows are discounted; risk premium factors; and tax methods and factors. Further details regarding the present valuations models are presented below.

The detailed valuation information may be used by the investor as presented on the detailed valuation quote screen 800 (which may be customized by the investor to reflect personal preferences as to which information is displayed and where it is displayed on a screen), or it may be downloaded (either directly or via e-mail or instant message, etc.) for use in one or more investment management software applications and/or spreadsheets.

Investors may sometimes wish to compare several model's valuations for the same asset, in order to better understand differing valuation viewpoints, and to ascertain the level of consistency that exists among the various model's valuation viewpoints. Most often, investors would access those valuation comparisons based on a single action of clicking on a "compare val. quotes" command button (e.g., button 722 shown in) on either the "Quick Valuation Quote" shown in FIG. 7 or the "Detailed Valuation Quote" shown in FIG. 8. The present system would then display the same type of valuation information provided by those quotes, but would display multiple sets of "Fair P/E" and "Over/Under Valuation" statistics (one for each valuation model being compared to). The present system will allow investors to have the system automatically select which model's results will be displayed in a comparison, or they can optionally define a personal set of models that they want to normally be displayed. The present system will also provide investors a "valuation comparison indexes", which gives them statistical measures of the level of variation that exists between the selected models' valuations. The simplest form of that index may be an "average percentage variation" of the individual model's valuations from the average of their valuations. With these comparisons investors will be able to more quickly and effectively determine whether they need to further investigate valuation computations.

Yet another option available for investors when using the present valuation tools is a "Portfolio Valuation Summary". An example of such a summary as displayed in a portfolio valuation summary screen 900 is illustrated in FIG. 9. The portfolio valuation summary screen 900 and its associated information may be displayed to the user in response to a single action by the investor invoking an appropriately labeled user interface element, such as a "Get Portfolio Valuation Summary" button or other similar element displayed at or through a broker system web site, investor resident computer application; or through independent access to the present system's investment tools.

Conventional asset portfolio summaries usually provide an investor with information concerning the current price, quantity (long or short), and market value (price multiplied by quality) of the assets in the portfolio. Occasionally, such summaries will include information concerning present gains and losses, but true future oriented valuation information (or even P/E information) is usually lacking. In contrast, the present portfolio valuation summary automatically provides much of the valuation information which was available for quick and detailed valuation quotes, but in the portfolio summary the information is displayed for all (or selected) assets in an investor's portfolio and is done in response to a single user action with a computer system (e.g., a mouse click or similar cursor control event). In addition, the portfolio valuation summary may include information concerning portfolio averages and weightings.

In short then, the present portfolio valuation summary allows investors to: access (on a portfolio-wide basis) all of the information discussed above with reference to the quick and/or detailed valuation quotes; review overall portfolio valuations and valuation ratings and statistics; and review and compare valuations of the assets in the portfolio. This enables investors to more effectively: identify assets with possible valuation issues, which the investor might want to investigate further; identify which assets have the highest levels of over and undervaluation, and therefore may need to have their positions increased or decreased; quickly understand and compare the overall forecasts and opinions of third party ratings services and analysts for all assets; quickly review valuation grades, ratings, and percentile rankings for assets; quickly review the valuation methods, models and factors utilized, and optionally change them; and quickly understand how their portfolio weightings compare to those of the overall market. As was the case for the detailed valuation quotes, investors may download the information in the portfolio valuation summary to one or more spreadsheets or investment management software, or easily send email communications (which may include preconfigured messages or message formats) to their advisors.

In particular, the present valuation tools provide examples of the following information which is generally not available from conventional portfolio summaries: various future multi-year and next-year earnings forecasts, dividend rates, analyst and investment service ratings and "fair valuation" statistics (consolidated from various investment service providers); and the total under or over valuation of each asset's position, computed based on the present fair value models (which may or may not be personalized for the investor's preferences, as desired), as expressed in a variety of ways. Preferably, though not necessarily, the portfolio valuation summary will reflect the valuation method and model which was used to produce the statistics, and allow the investor to choose alternative models, methods and data from one or more user interface selection elements (e.g., pull-down menus). Among the factors that are used by the present valuation models to develop the valuations reflected in the portfolio valuation summary, and which may be automatically populated based on default data values, are: estimated future earnings per share growth rates, dividend yield percentages, estimated amount of time the investor will hold the securities in the portfolio, types of P/E statistics used by the model(s) to estimate the P/Es of the portfolio's assets at the simulated time(s) of sale (e.g., historical 10 year averages), rates of return at which cash flows are discounted, average risk premium factors, and taxation methods and factors. Using the present portfolio valuation summary, an investor may run a comparison of a portfolio's industry weightings with that of the overall market.

As with the quick quote and detailed quote, appropriate user interface elements can provide links to other features of the present valuation tools. For example, links to various "Valuation Investigations" and "Funds Flow Tracking and Momentum" investigation processes may be provided through buttons 902 and 904, respectively. Also, appropriate user interface elements such as buttons 906, 908 and/or 910 may be provided to facilitate communication with the investor's advisors, downloading of the valuation information and/or return to the broker system, respectively. Although the example of the portfolio valuation summary screen 900 shown in this illustration is quite comprehensive, investors can choose to simplify the display by choosing to suppress some or most of the valuation and other information being displayed. Such user interface customization techniques are well known in the art and need not be discussed further herein.

Through the various quick valuation quotes, detailed valuation quotes and portfolio valuation summaries provided by embodiments of the present invention, investors have access to a number of features and benefits which were not available through conventional broker systems. For example, through the present quote and summary mechanisms investors may: receive and customize future value-oriented information on their assets and portfolio quickly and simply (without laboriously consolidating unconnected information from third party sources and multi-step valuation models); obtain immediate feedback regarding fair value estimates for their assets, including feedback on under or over valuations as compared to current asset prices under a variety of buy/hold/sell scenarios); and obtain immediate feedback regarding asset ratings (based on valuation model computations that the investor can investigate and personalize if so desired). In each case, the investor may easily transfer this information to third parties (e.g., investment advisors) and/or other investment management applications and/or spreadsheets.

Valuation Model Support

As indicated above, the present valuation tools support both conventional and new valuation models. These models are used to determine the valuation statistics (e.g., the fair values, over or under valuation estimates and the ratings) described above, for presentation via the quick, detailed or portfolio summary reports. The selection of which model or models upon which to base these computations may be placed under individual investor control or may be limited to a set of preconfigured models designed to produce results that are generally applicable to a wide cross-section of likely users. Examples of the types of conventional valuation models that investors may access through the present valuation tools include, but are mot limited to:

- Discounted Intrinsic Value of Earnings: this is a valuation model which utilizes various factors to discount the value of all future earnings and subtracts long-term debt (similar to those supported by commercially available money management software applications).
- Average P/E Multiples: this valuation model uses either the stock's or its industry's prior 12-month, future fiscal year, or average and trend adjusted average P/Es to compute a fair value for the stock.
- Price to Sales Ratios: this valuation model uses either the stock's or its industry's prior 12-month, future fiscal year, or average and trend adjusted average price to sales ratios to compute a current fair value for the stock.
- PEG Ratio: The "Price to Earnings Growth" valuation model used by most investment services to detect valuation issues, and over/under valuations is based on how a stock's PEG varies from either that of the overall market, the average of the applicable industry, or investor-defined PEG averages.

In addition to these conventional models, the present investment tools supports a unique buy/hold/sell valuation model based on a discounted cash flow model which simulates the future cash flow value of an asset, enables investors to use a variety of methods and sources to get its forecast factors, and optionally allows investors to personalize it for their specific rate of return expectations, holding periods, future P/E and dividend expectations, risk premiums, and tax situations. In the event an investor does not wish to so personalize the model with his/her own criteria for investments, the model may automatically utilize a set of default valuation factors when computing the asset valuations, enabling investors to model valuations without having to input any information.

The present valuation model is based on what is believed to be an average value investor's trading pattern of buying a security, holding it for a period of time, receiving dividends during that holding period, and selling it at the end of the holding period. The model simulates what the investor's cash flow would be under this buy/hold sell scenario (based on several investor adjustable parameters); determines what a fair value price and/or P/E would be for the asset by discounting that cash flow based on standardized or customizable expected rates of return; and compares the result with the asset's current price and/or P/E to produce an estimate of the asset's present under or over valuation. Algorithmically, the fair price may be expressed as:

$$FP=PV_i(-P_o+\Sigma D_t+P_x)$$

where, $PV_i$ is the asset's present value at the risk-adjusted rate of return expectation i %

$P_o$ is the asset's current price, $\Sigma D_t$ is the series of dividends or net cash flows for periods t received from the asset over the holding period, and $P_x$ is the estimated future price of the asset at the end of the holding period.

The present valuation model includes many adjustment factors that allow investors to use either default, historical average, or selected personalized values for many parameters, including: the starting EPS upon which to base computations; the EPS growth rate factor; the holding period; various dividend rate factors; the anticipated P/E factor used to determine the price at which the asset will be sold at the end of the holding period; various taxation treatment factors; and various risk factors. FIG. 10 illustrates in further detail how the model uses various parameters and computations in order to determine an estimated fair price, and consequentially an over/under valuation estimate.

As discussed earlier, FIG. 11 shows an example of the output of the present valuation model's computations for a stock asset under an exemplary buy/hold/sell scenario. Any or all of this information could be downloaded to an investor's software application of choice (or a simple spreadsheet) and/or provided to the investor's advisor or other message recipient. In addition, through selection of an appropriate interface element the user may be provided with a graphical display that shows the distribution of rates of returns of other comparable assets, which enables investors to better understand how this assets returns compares to those provided by others.

Optional Investor Profile Customization

As indicated above, the present models may have one or more parameters pre-populated with data reflecting preferences for "typical" investors. At the investor's option, however, these parameters may be modified to reflect that investor's personal preferences. For example, the investor may simply refine his or her "investor category" upon which certain computations or other parameters (e.g., tax rates) are based, or select a personal group of models to be displayed in multiple model valuation comparisons. Further some sophisticated investors may choose to supply virtually all of the parameters themselves so as to truly customize or personalize the valuation information that the present model produces. Such customization options may be provided to all or only a selected few investors on a free or pay-for basis. Having the ability to so personalize the valuation model will enable individual investors to more easily make investment decisions that are more consistent with their personal preferences.

Rating Methods and Models

In addition to computing "fair values" and measures of an asset's over/under valuation, the present valuation tools are also able to compute customized ratings for the assets under consideration. These ratings may be represented by letter grades, numerical ratings and/or percentile rankings. In each case the valuation ratings will be determined based on a weighted valuation rating model. The ratings model may utilize a variety of factors and weightings, such as: the overall valuation of the asset (based on one or more modeling approaches); third party analyst or service provider averages or individual ratings; earning potential; and/or market momentum. Various weighting factors may be adjusted and applied so as to take into account investor preferences and customizations when computing the rankings.

In one embodiment, after computing the asset valuation (through any or a number of models), the asset's valuation ranking may be derived using a lookup table and applying the rating that corresponds to the computed valuation. Alternatively or in addition, the ranking may be based on a summary (or a weighted summary) of multiple valuation factors such as third party ratings or similar evaluations. Either or both of these methods may be applied in the context of the rating (or ranking) of the asset's overall valuation or any of the parameters which go into a computation of that valuation. That is, assets can receive ratings or rankings of individual parameters in addition to or in place of a valuation rating/ranking. Facilities for displaying ranking distributions for similar assets, asset classes, or for comparing rating services may also be provided. For example, rankings provided by third party advisors may be compared side-by-side (or in another fashion) to those developed by the present valuation tools.

In addition to providing raw rankings/ratings the present valuation tools may also provide graphical presentations of such information that place such information in context. For example, certain graphical representations of this type of information may allow investors to see the ratings distribution for an overall market or market segment, or an entire industry group. With such graphs investors will be able to better understand the ratings that have been computed, and better evaluate a given asset's rate of rating percentile position.

Funds Flow Momentum Monitoring

The overall amount of investment and new money going into or out of mutual and money market funds (referred to as "net inflows/outflows") can have significant impact on individual stock prices. It can also impact when the right timing is for buying or selling a stock. Currently, for most investors, analyzing that information is a laborious task. Indeed, many investors do not even have ready access to the information and so the data collection itself can be a difficult time consuming process.

With respect to these net inflows/outflows, the present valuation tools will allow investors to quickly access this basic information (e.g., on a period basis and by major category of fund), analyze how those inflows/outflows compare to the fund's overall asset balances (e.g., on a present day and/or historical basis), and compute a "funds flow momentum index" which highlights changes in historical funds flow patterns. As was the case with other information produced/provided by the present tools, this information may be presented in any of a variety of fashions, including charts and/or graphs, either or both of which may be fully or partially customizable by the investor.

The funds flow momentum index of the present invention is based on a funds flow monitoring method and may be calculated as follows:

$$FFMI_x = NF_x / HNF_x$$

where, $FFMI_x$="Funds Flow Momentum Index"
$NF_x$="% net inflow/outflow" for a time period (x)
$HNF_x$=historical "% net inflow/outflow" averages for a time period (x)

Using this index, individual investors need not laboriously collect and analyze funds flow data from other information service providers in order to gain an understanding of how funds are moving into and/or out of a particular asset. By reviewing the FFMI for the designated asset, the investor can immediately obtain an indication of the relative strength of the levels of net funds inflow/outflows that have occurred for a period. Such indications can be representative of general market valuation expansion or contraction, and so having this information easily available will help investors to more effectively time their stock purchases and sales.

Optional Tax and Risk Valuation Adjustments

Earlier it was indicated that several of the present valuation model's results may vary to some degree according to the tax and/or risk profile of the individual investor. Accordingly, investors are provided with options for varying or refining those profiles in order to customize or personalize the valuation information they receive. In the case of taxation profiles, investors may wish to examine the valuation information on a pre-tax or post-tax (or both) basis. Accordingly, the present valuation model may be configured to discount cash flows according to either or both of these bases, based on standard tax rate information or rates selected by the investor. In particular, if the investor wishes to analyze the post-tax value of an asset, the models will utilize standardized or customized tax rate information for the dividends expected, the capital gains expected and any tax free or reduced tax allowances. After-tax cash flows may then be determined for the appropriate period under consideration by reducing the pre-tax cash flows by an amount equal to the tax payable thereon. After-tax gains should be similarly reduced by any capital gains tax payable thereon. Both of these after-tax values may then be used to compute the after-tax present value of the asset, which should be based on an investor's after tax-rate of return expectation, which would be lower than their pre-tax return expectations.

As to risk premiums (which may or may not be taken into account in determining the valuation information, at the investor's option), either an annual risk premium or an overall risk premium (or both, e.g., where one is used to set a valuation floor, etc.) may be taken into account when computing the valuation information. Sophisticated investors can benefit from this risk-adjusted valuation process because high risk vs. low risk investments may need to be understood differently in terms of their value. As indicated above, the present valuation model allows for an annual risk premium to be added to the investor's basic rate of return expectations. This causes the present value of the cash flow to be lower than that which would exist in a no-risk scenario, resulting in a lower fair value estimation. Alternatively, or in addition, an overall risk premium may be applied such that cash flows from asset dividends over a designated holding period and/or any increases in asset prices based on asset sales at the end of the holding period are reduced by the overall risk premium factor. This causes the present value of the cash flow to be lower than that which would be present if there were no risk premium, resulting in a lower fair value than would otherwise exist.

Semi-Automated Investor and Advisor Messaging

Throughout the above discussion reference has been made to various communication options which investors can use to communicate valuation or other results to their investment advisors or others. Where appropriate the present valuation tools facilitate such communications through the provision of user interface elements that will launch (either at the valuation tool server or at the user's personal computer) appropriate communication applications (such as e-mail applications or instant messenger applications or the like) and populate predefined messages formatted using those applications with the valuation and other information currently being reviewed by the investor. Such communication facilities allow for more rapid dissemination and feedback on valuation information, and the investor decisions based thereon should be more effective.

Thus, systems and methods for investors determining, presenting and evaluating information related to the fair values and other valuation metrics for assets (such as stock, bonds, properties, etc) have been described. As indicated throughout the above discussion, the present investment tools methods, tools, and programs can be implemented with:

non-disruptive add-ons and/or links to existing broker systems (e.g., from providers who have explicitly decided to make the investment tools available to their customers);

primarily Internet-based interactions with an investor's personal computers; and/or periodic transfers of modest amounts of data between information provider computers, investment tools server computers, broker computers, and the investor's computers.

The present computer methods, programs and systems may be delivered to investors as: optional processes that may be executed "on-demand" from the broker systems they already use for their stock or mutual find trading, or pension fund activities; or as systems and processes that they can utilize semi-independently of their broker systems. Once a provider has made the system available to investors, investors may use the system as a seamless part of their traditional investing activities. The customizable investment methods, tools, and programs may be implemented as: non-disruptive add-ons and/or links to existing broker systems; Internet based support of the investor on their personal computers; optional enhanced investment tool functionality, programs, and databases that reside on investor computers; and periodic transfers of modest amounts of data from information providers, independent computer systems, and/or investor service provider computer systems. Therefore, although discussed with reference to several illustrated embodiments, it should be remembered that the scope of the present invention is not to be limited thereby, and instead should only be measured in terms of the claims, which follow.

What is claimed is:

1. A computer-implemented method, comprising:
   (a) determining, by a computing device, an estimated present fair value of an asset by consolidating selected
      (i) historical performance data regarding the asset,
      (ii) forecast information regarding the asset, and
      (iii) valuation information provided by one or more investment information service providers, said valuation information regarding the asset,
   all according to:
      (x) fair value estimation processes that utilize one or more of financial information concerning the asset, financial forecasts concerning the asset, presently valued cash flows concerning the asset, and
      (y) valuation parameters aligned with an investor profile; and
   (b) presenting the estimated present fair value in a format reflecting an over/under valuation of the asset as compared to its price.

2. The computer-implemented method of claim 1, wherein the estimated present fair value is determined according to one or more valuation models.

3. The computer-implemented method of claim 2, wherein the estimated present fair value is determined according to those of the one or more valuation models selected by a user.

4. The computer-implemented method of claim 1, wherein the estimated present fair value is determined and presented in response to a single user interaction with a computer system.

5. The computer-implemented method of claim 4, wherein the single user interaction with the computer system comprises a selection of a user interface element presented in a graphical user interface.

6. The computer-implemented method of claim 5, wherein the format in which the estimated present fair value is presented comprises a quick valuation quote which includes an identification of the asset, its present price and the estimated present fair value.

7. The computer-implemented method of claim 5, wherein the format in which the estimated present fair value is presented comprises a detailed valuation quote which includes an identification of the asset, its present price and at least a summary of parameter values used to compute the estimated present fair value.

8. The computer-implemented method of claim 5, wherein the format in which the estimated present fair value is presented comprises a portfolio valuation summary of which the asset is one component.

9. The computer-implemented method of claim 2, wherein the investor profile comprises one or more of: risk premium preferences and tax treatment preferences.

10. The computer-implemented method of claim 1, wherein the estimated present fair value is determined according to a valuation model in which a present value for the asset at a risk-adjusted rate of return is computed using (i) an expected future price of the asset upon expiration of a holding period, and (ii) a series of individual dividend cash flows for the asset expected during the holding period, (iii) less a present price of the asset.

11. The computer-implemented method of claim 1, further comprising evaluating the estimated present fair value of the asset through comparisons with fair values of other assets and presenting evaluation results in accordance therewith.

12. The computer-implemented method of claim 11, wherein the evaluation results are presented as a percentile position relative to a grouping of similar assets.

13. The computer-implemented method of claim 11, wherein the evaluation results are presented in relation to a distribution of results obtained for a grouping of similar assets.

14. The computer-implemented method of claim 1, further comprising comparing the estimated present fair value of the asset as determined according to a first valuation model with other fair values for the asset determined according to other valuation models and presenting results for each of the present fair value determinations.

15. The computer-implemented method of claim 1, further comprising determining an historical fair value for the asset using historical performance information for the asset as one or more inputs to a valuation model and presenting the historical fair value as so determined.

16. The computer-implemented method of claim 15, wherein the valuation model used to determine the historical fair value is also used to determine the present fair value of the asset.

17. The computer-implemented method of claim 1, further comprising presenting a rate of return distribution graph configured to indicate a rate of return distribution for an entire asset class and annotated to reflect an expected rate of return for the asset based on the estimated present fair value.

18. A method for generating a user interface for a computer system, the method comprising:
   generating one or more screens for display via the computer system, the screens presenting an estimated present fair value of an asset, the estimated present fair value computed, by a computing device, according to a valuation model that consolidates selected
      (i) historical performance data regarding the asset,
      (ii) forecast information regarding the asset, and
      (iii) valuation information provided by one or more investment information service providers, said valuation information regarding the asset, all according to:
- (x) fair value estimation processes that utilize one or more of financial information concerning the asset, financial forecasts concerning the asset, presently valued cash flows concerning the asset, and
- (y) valuation parameters aligned with an investor profile; and displaying the one or more screens at the computer system.

19. The method of claim 18, wherein the valuation model further determines an over/under valuation of the asset as compared to its price.

20. The method of claim 18, wherein the estimated present fair value is presented in a format reflecting a comparison with an overall population of similar fair values for similar assets.

21. The method of claim 20, wherein the estimated present fair value is presented in a format reflecting an over/under valuation of the asset as compared to its price.

* * * * *